US012565357B2

(12) United States Patent
Miyatani et al.

(10) Patent No.: US 12,565,357 B2
(45) Date of Patent: Mar. 3, 2026

(54) REPLACEABLE COMPONENT FOR A BEVERAGE CONTAINER, A COMBINATION OF A REPLACEABLE COMPONENT FOR A BEVERAGE CONTAINER AND A BEVERAGE CONTAINER, AND A METHOD OF USING A REPLACEABLE COMPONENT FOR A BEVERAGE CONTAINER

(71) Applicants: Asahi Group Holdings, Ltd., Tokyo (JP); Asahi Breweries, Ltd., Tokyo (JP)

(72) Inventors: Tomohisa Miyatani, Ibaraki (JP); Tsutomu Maeda, Ibaraki (JP); Masanori Yamagishi, Tokyo (JP); Motohiro Inagaki, Tokyo (JP)

(73) Assignees: ASAHI GROUP HOLDINGS, LTD., Tokyo (JP); ASAHI BREWERIES, LTD., Tokyo (JP)

( * ) Notice: Subject to any disclaimer, the term of this patent is extended or adjusted under 35 U.S.C. 154(b) by 624 days.

(21) Appl. No.: 17/912,914

(22) PCT Filed: May 10, 2021

(86) PCT No.: PCT/JP2021/017635
§ 371 (c)(1),
(2) Date: Sep. 20, 2022

(87) PCT Pub. No.: WO2021/241177
PCT Pub. Date: Dec. 2, 2021

(65) Prior Publication Data

US 2023/0166887 A1 Jun. 1, 2023

(30) Foreign Application Priority Data

May 29, 2020 (JP) ................................ 2020-094188

(51) Int. Cl.
*B65D 77/06* (2006.01)
*B65D 25/48* (2006.01)
(Continued)

(52) U.S. Cl.
CPC ............ *B65D 25/48* (2013.01); *B65D 85/72* (2013.01); *B67D 1/0801* (2013.01);
(Continued)

(58) Field of Classification Search
CPC .............................. B65D 77/06; B65D 25/48; B67D 2001/0828; B67D 1/0462; B67D 1/0832; B67D 1/0801
(Continued)

(56) References Cited

U.S. PATENT DOCUMENTS 2,338,604 A * 1/1944 Silveyra ................ B65D 25/16
229/117.35
3,083,875 A 4/1963 Welty et al.
(Continued)

FOREIGN PATENT DOCUMENTS

| | | |
|---|---|---|
| CN | 106185033 | 12/2016 |
| EP | 0 389 191 | 9/1990 |

(Continued)

OTHER PUBLICATIONS

English language translation of Notice of Reasons for Refusal issued Jun. 3, 2024 in corresponding Japanese Patent Application No. 2020-094188.
(Continued)

*Primary Examiner* — Charles P. Cheyney
(74) *Attorney, Agent, or Firm* — Wenderoth, Lind & Ponack, L.L.P.

(57) ABSTRACT

A replaceable component for a beverage container to be attached to a beverage extraction pipe of the beverage container is provided. The replaceable component for a
(Continued)

beverage container includes a tubular member slidable along a longitudinal direction of the beverage extraction pipe and capable of coming in annular contact with an outer circumferential surface of the beverage extraction pipe, and a bag, which is attached to the tubular member, for containing a beverage.

20 Claims, 25 Drawing Sheets

(51) Int. Cl.
*B65D 85/72* (2006.01)
*B67D 1/08* (2006.01)
*B67D 7/02* (2010.01)

(52) U.S. Cl.
CPC ......... *B67D 7/0266* (2013.01); *B67D 7/0294* (2013.01); *B67D 2001/0828* (2013.01)

(58) Field of Classification Search
USPC ........................................ 222/95, 105, 400.7
See application file for complete search history.

(56) References Cited

U.S. PATENT DOCUMENTS

| | | | | |
|---|---|---|---|---|
| 3,599,843 | A | 8/1971 | Johnston | |
| 7,111,442 | B1 * | 9/2006 | Van Baal | B65D 77/06 53/284.7 |
| 7,604,147 | B2 * | 10/2009 | Anderson | B67D 1/0462 222/105 |
| 8,777,056 | B2 * | 7/2014 | Bates | B65D 7/045 222/105 |
| 9,714,163 | B2 * | 7/2017 | Standaert | B67D 1/0418 |
| 9,802,807 | B2 * | 10/2017 | Ware | B67D 7/06 |
| 10,486,956 | B2 * | 11/2019 | Ware | B67D 7/0288 |
| 10,882,729 | B2 * | 1/2021 | Ye | B67D 1/1281 |
| 2009/0020176 | A1 * | 1/2009 | Hasegawa | B67D 7/0261 222/105 |
| 2009/0184133 | A1 | 7/2009 | Hasegawa et al. | |
| 2010/0102087 | A1 * | 4/2010 | Meike | B67D 1/0832 222/105 |
| 2012/0037625 | A1 * | 2/2012 | Hasunuma | F16L 37/413 220/200 |
| 2012/0104035 | A1 * | 5/2012 | Bates | B65D 7/045 222/105 |
| 2020/0307898 | A1 * | 10/2020 | Rhoades | B67D 1/0832 |
| 2023/0035704 | A1 * | 2/2023 | Gebbink | B67D 1/0462 |

FOREIGN PATENT DOCUMENTS

| | | |
|---|---|---|
| EP | 2 583 934 | 4/2013 |
| FR | 2 138 685 | 1/1973 |
| JP | 2001-206444 | 7/2001 |
| JP | 2006-510469 | 3/2006 |
| JP | 2012-35900 | 2/2012 |
| JP | 2014-223947 | 12/2014 |
| JP | 2016-533309 | 10/2016 |
| JP | 2016-534947 | 11/2016 |
| JP | 2016-203988 | 12/2016 |
| JP | 2019-135413 | 8/2019 |
| JP | 2019-142581 | 8/2019 |
| JP | 2019-147612 | 9/2019 |
| WO | 03/095101 | 11/2003 |
| WO | 2007/088661 | 8/2007 |
| WO | 2015/042109 | 3/2015 |
| WO | 2015/058090 | 4/2015 |
| WO | 2015/068819 | 5/2015 |
| WO | 2015/156085 | 10/2015 |
| WO | 2017/031558 | 3/2017 |
| WO | 2020/198217 | 10/2020 |

OTHER PUBLICATIONS

Office Action issued Oct. 22, 2024 in corresponding Chinese Patent Application No. 202180027684.2, with machine English translation.
Extended European Search Report issued May 13, 2024 in corresponding European Patent Application No. 21813572.1.
International Search Report issued Jun. 29, 2021 in International (PCT) Application No. PCT/JP2021/017635.

* cited by examiner

REPLACEABLE COMPONENT FOR A BEVERAGE CONTAINER, A COMBINATION OF A REPLACEABLE COMPONENT FOR A BEVERAGE CONTAINER AND A BEVERAGE CONTAINER, AND A METHOD OF USING A REPLACEABLE COMPONENT FOR A BEVERAGE CONTAINER

TECHNICAL FIELD

The present invention relates to a replaceable component for a beverage container, a combination of a replaceable component for a beverage container and a beverage container, and a method of using a replaceable component for a beverage container.

BACK GROUND ART

A technique of forming a beverage extraction part by fixing a fitting to a mouth portion of a beverage storage container is known.

FIG. 1 shows an example of a conventional beverage storage container 1. FIG. 1 shows a state in which a fitting 10 is attached to a mouth portion 15 by threaded engagement formed between a male threaded portion 10*s* of the fitting 10 and a female threaded portion 15*s* of the mouth portion 15.

When a beverage is taken out from the conventional beverage storage container 1, carbon dioxide gas is supplied into the beverage storage container 1 to increase a pressure in the beverage storage container 1, and the pressure pushes the beverage out of the beverage storage container 1.

In the conventional beverage storage container 1, the beverage comes in direct contact with the beverage storage container 1. Therefore, when the beverage storage container 1 is collected and reused, workload and cost required for managing an internal state of the beverage storage container 1 are large.

As a related art, Patent Literature 1 discloses a dispense head. The dispense head described in Patent Literature 1 is connected to a container constituted by an outer casing and a bag arranged inside the outer casing. In Patent Literature 1, the bag is filled with a beverage, and the beverage does not come in direct contact with the outer casing.

CITATION LIST

Patent Literature

[Patent Literature 1] JP 2011-501720A

SUMMARY

An object of the present invention is to provide a replaceable component for a beverage container which can be easily attached to a beverage extraction pipe, a combination of the replaceable component and a beverage container, and a method of using the replaceable component.

A replaceable component for a beverage container according to some embodiments is a component attachable to a beverage extraction pipe of the beverage container. The replaceable component includes a tubular member slidable along a longitudinal direction of the beverage extraction pipe and capable of coming in annular contact with an outer circumferential surface of the beverage extraction pipe, and a bag for containing a beverage attached to the tubular member.

A combination of a replaceable component for a beverage container and a beverage container according to some embodiments includes the beverage container and the replaceable component for a beverage container. The beverage container includes a beverage container main body and a beverage extraction pipe inserted into the beverage container main body. The replaceable component includes a tubular member slidable along a longitudinal direction of the beverage extraction pipe and which comes in annular contact with an outer circumferential surface of the beverage extraction pipe, and a bag for containing a beverage attached to the tubular member.

A method of using a replaceable component for a beverage container according to some embodiments is a method of using a replaceable component including a tubular member and a bag attached to the tubular member. The method of using a replaceable component for a beverage container includes: inserting a lower end of a beverage extraction pipe into the tubular member; sliding the tubular member along a longitudinal direction of the beverage extraction pipe such that a part of the beverage extraction pipe protrudes from a lower end of the tubular member; attaching the replaceable component to the beverage extraction pipe such that a state in which the tubular member is in annular contact with an outer circumferential surface of the beverage extraction pipe is maintained; and inserting the beverage extraction pipe to which the replaceable component has been attached into the beverage container.

According to the present invention, it is possible to provide a replaceable component for a beverage container which can be easily attached to a beverage extraction pipe, a combination of the replaceable component and a beverage container, and a method of using the replaceable component.

DESCRIPTION OF EMBODIMENTS

Figure 1:
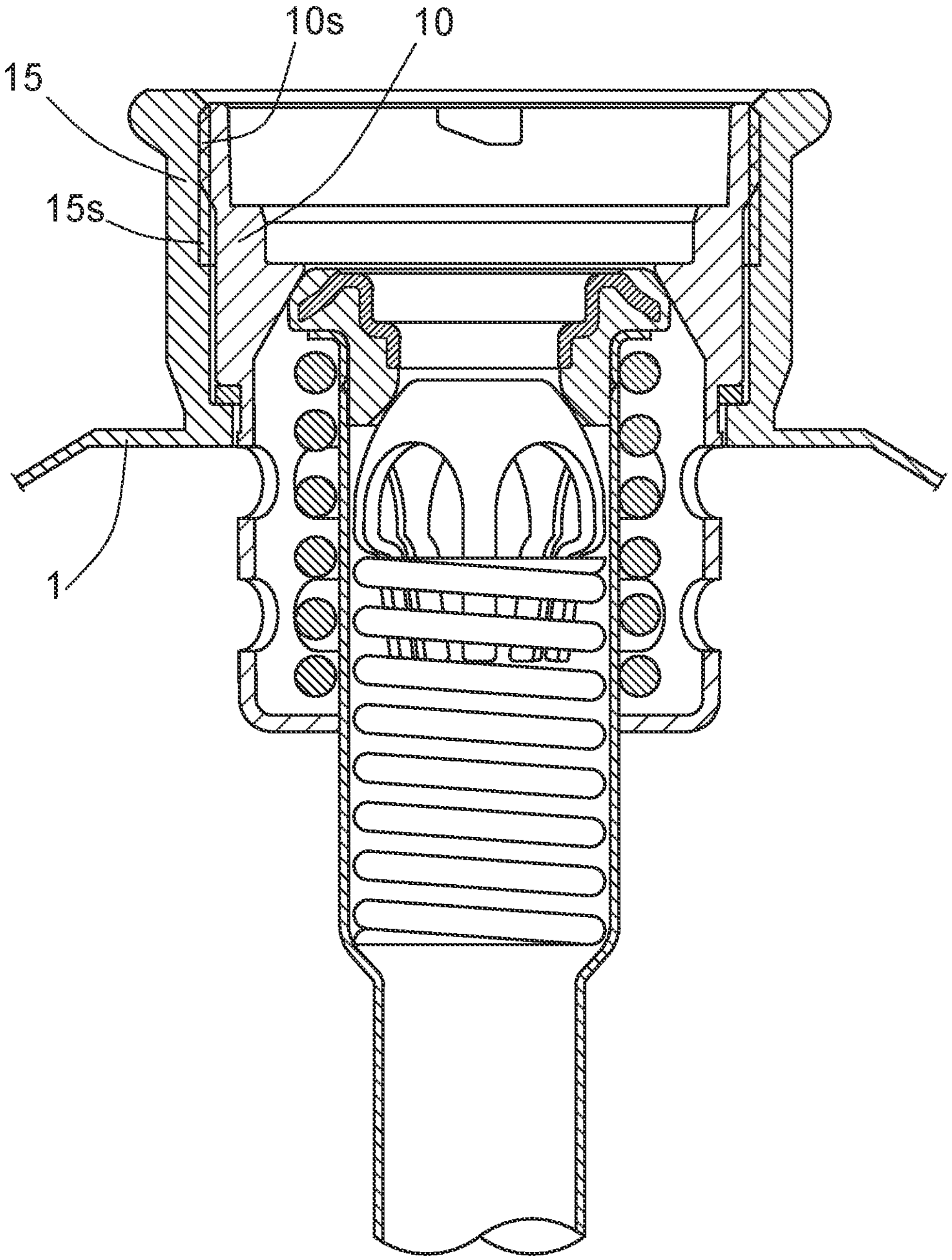
FIG. 1 is a cross-sectional view schematically showing a conventional beverage storage container.

In some embodiments, as a beverage container 4, an existing stainless steel beverage container provided with a beverage extraction pipe (in other words, a down tube) may be used. In this case, a beverage may be taken out from the beverage container using an existing dispensing device (dispense head), and a filling step and an extraction step may be executed in a same manner as already existing steps. In other embodiments, as a beverage container 4, a beverage container other than the existing stainless steel beverage container, for example, a plastic beverage container such as a PET bottle may be used.

In some embodiments, as a beverage container 4, a repeatedly reusable beverage container (e.g., a beverage container made of stainless steel) is used, and as a bag 30 in which the beverage is filled, a replaceable bag that can be replaced with a new bag after use is used. In this case, a beverage filled in a second bag after replacement may be a second beverage of a different type from a first beverage that had been filled in a first bag before replacement. In other words, the type of beverage stored in the beverage container 4 can be easily changed according to changes in consumer needs, seasonal changes, and the like. In other embodiments, as a beverage container 4, a beverage container other than the repeatedly reusable beverage container, for example, a disposable beverage container may be used.

Hereinafter, a replaceable component 2 for a beverage container, a combination of the replaceable component 2 for a beverage container and a beverage container 4, and a method of using the replaceable component 2 for a beverage container will be described with reference to accompanying drawings. In the following description, members and portions having the same functions are denoted by the same reference numerals, and repeated descriptions of members and portions denoted by the same reference numerals are omitted. In the following description, a "bag" is a bag capable of containing a beverage. The bag may be a bag capable of containing an alcoholic beverage such as beer, sparkling alcohol, wine, sake, or spirituous liquor. Further, the "bag" may be a bag capable of containing a non-alcoholic beverage such as non-alcoholic beer, juice, or carbonated drink.

First Embodiment

Figure 2:
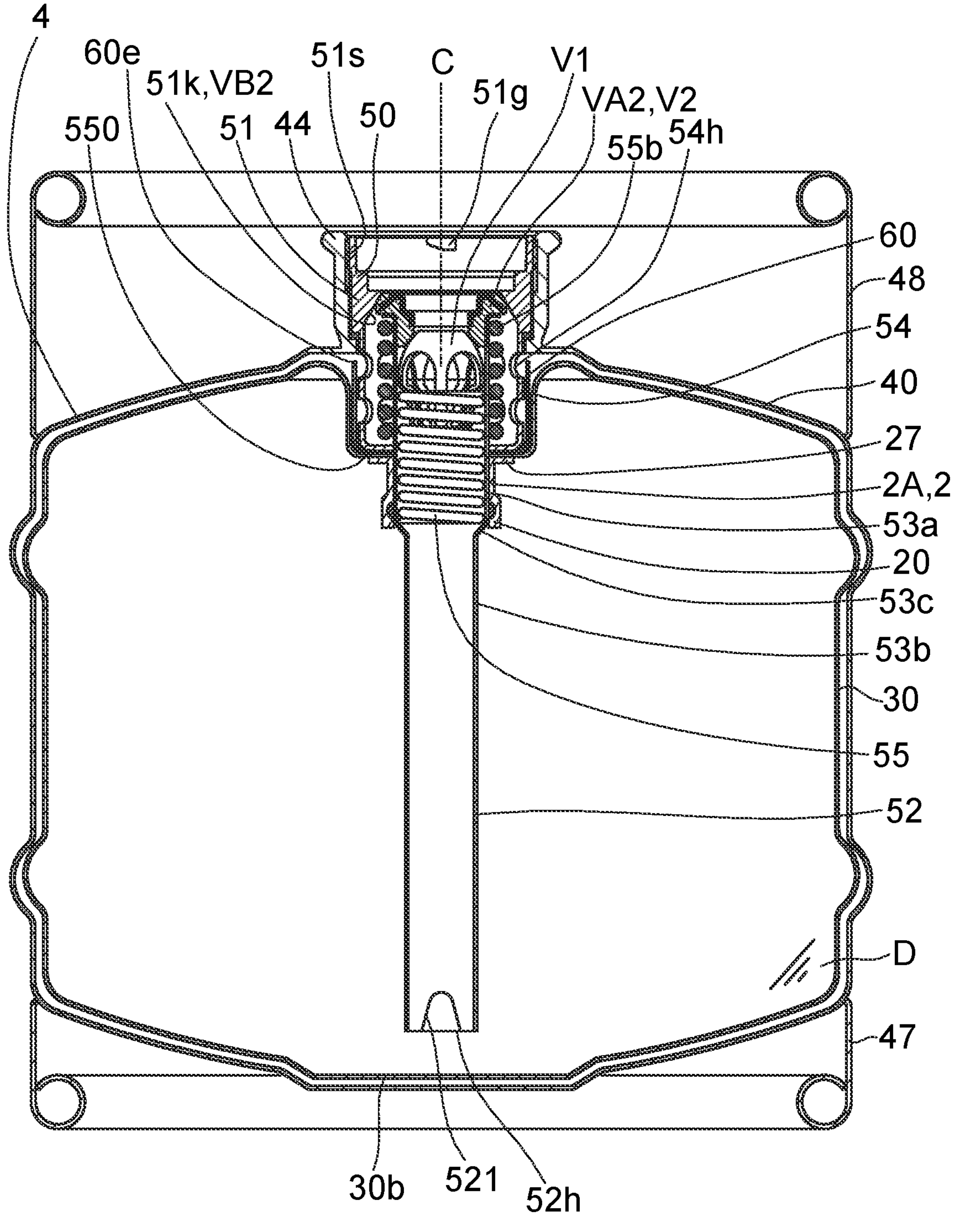
FIG. 2 is a schematic cross-sectional view schematically showing a combination of a replaceable component for a beverage container and a beverage container according to a first embodiment.
Figure 3:
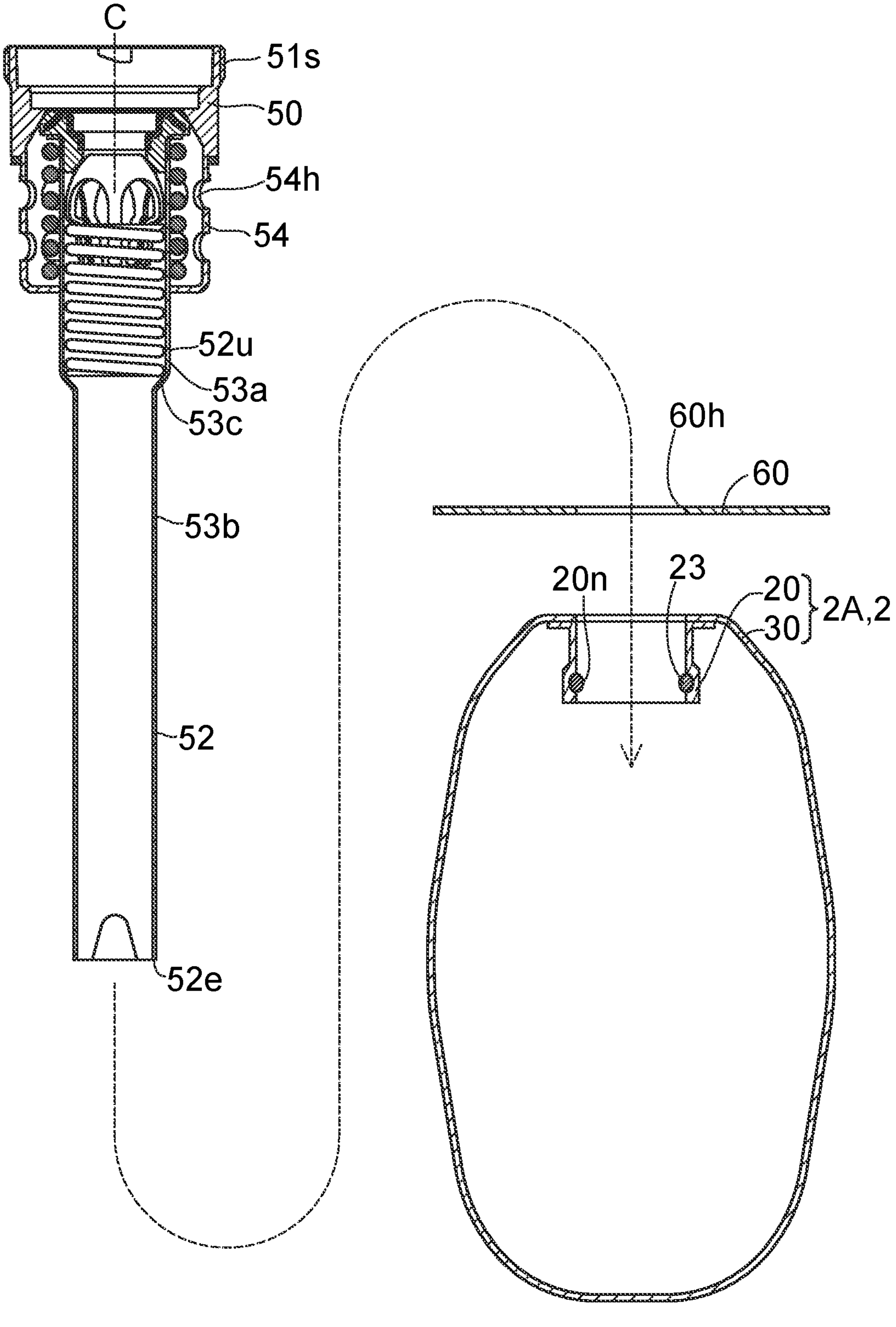
FIG. 3 is a schematic cross-sectional view schematically showing a state before the replaceable component for a beverage container according to the first embodiment is attached to a beverage extraction pipe.
Figure 4:
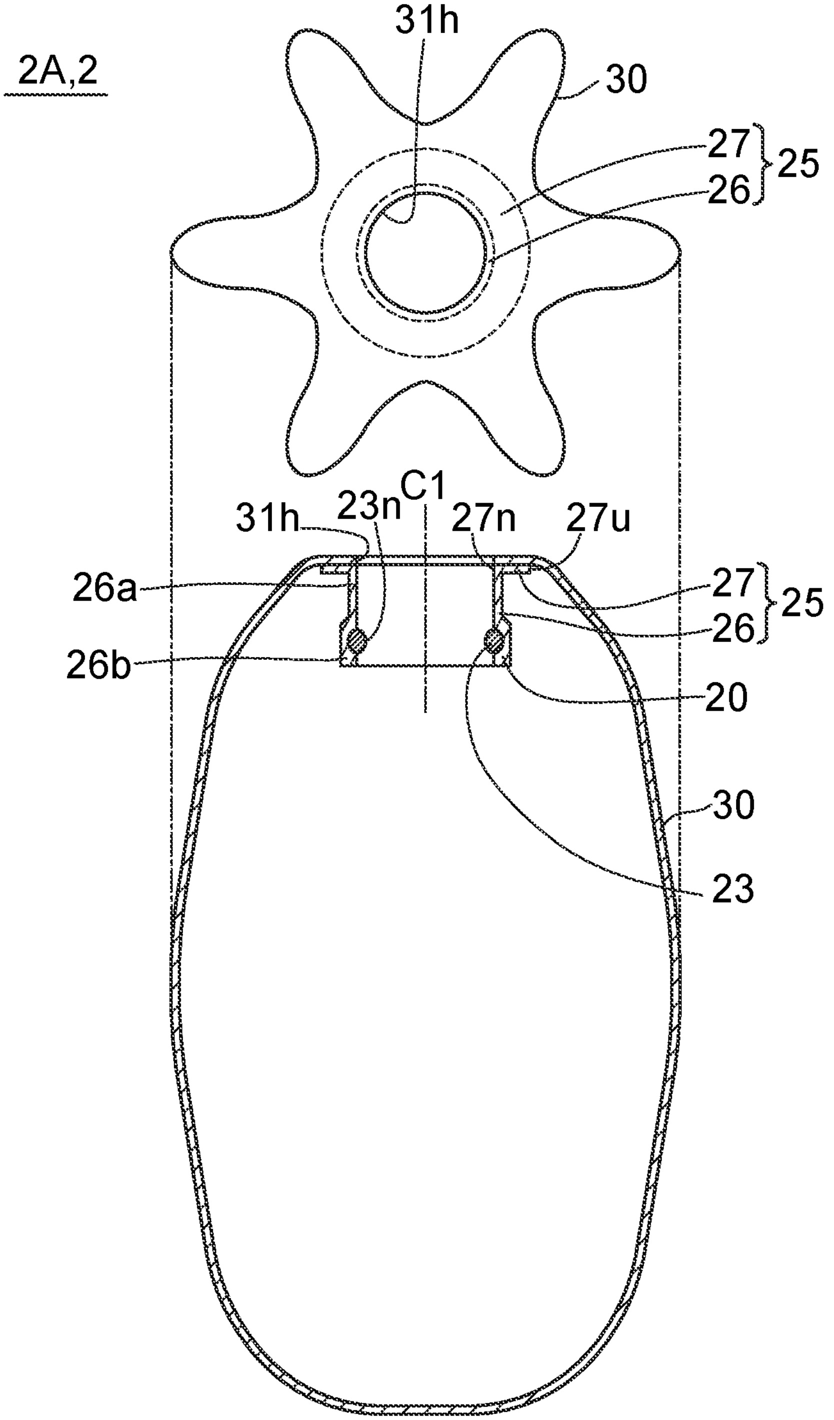
FIG. 4 is a schematic two-view schematically showing the replaceable component for a beverage container according to the first embodiment.
Figure 5:
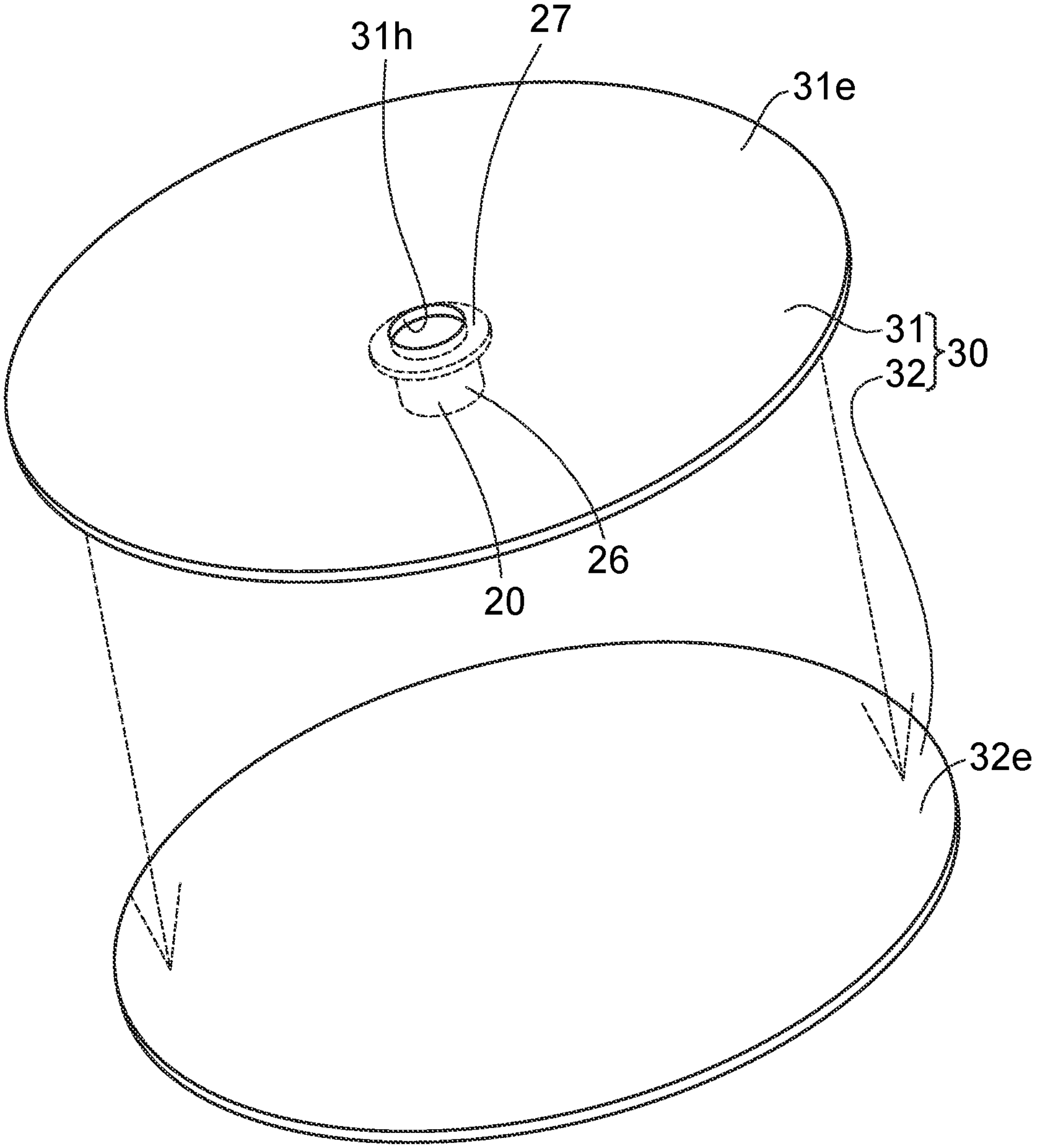
FIG. 5 is a schematic perspective view schematically showing how the replaceable component for a beverage container is formed.
Figure 6:
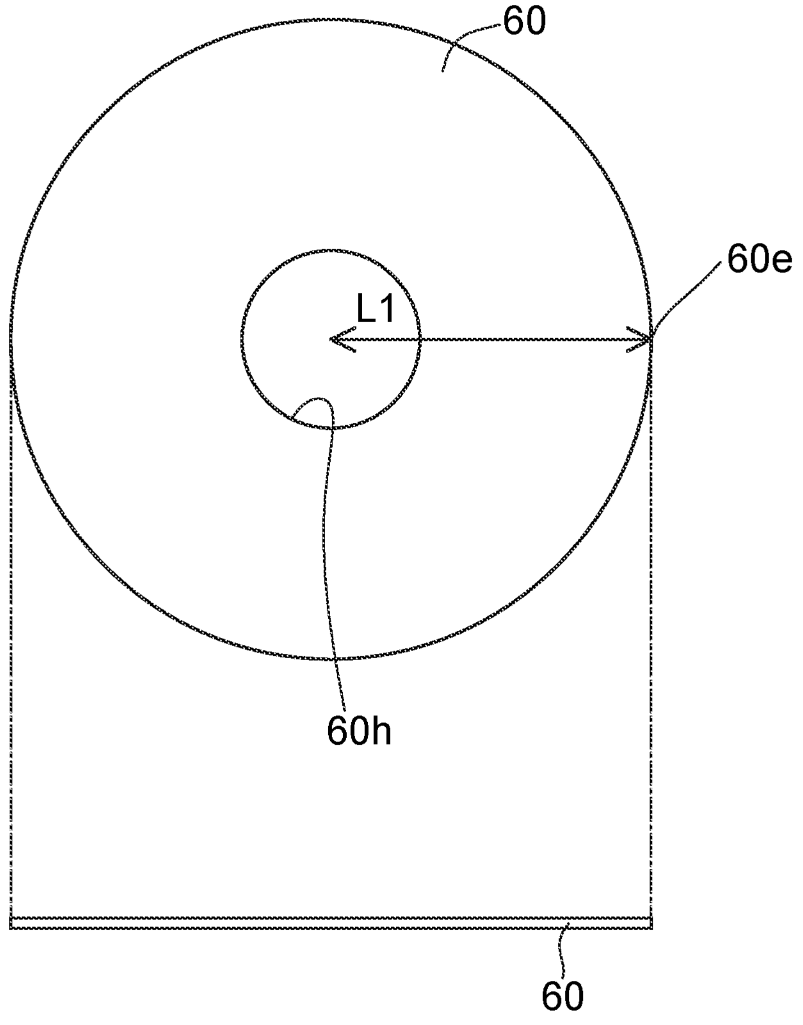
FIG. 6 is a schematic two-view schematically showing a protective sheet.

Referring to FIGS. 2 to 6, a replaceable component 2A for a beverage container according to a first embodiment, and a combination of the replaceable component 2A for a beverage container and a beverage container 4 will be described. FIG. 2 is a schematic cross-sectional view schematically showing the combination of the replaceable component 2A for a beverage container and the beverage container 4 according to the first embodiment. Note that FIG. 2 shows a state after the replaceable component 2A for a beverage container is attached to the beverage container 4 and a beverage D is filled in a bag 30. FIG. 3 is a schematic cross-sectional view schematically showing a state before the replaceable component 2A for a beverage container according to the first embodiment is attached to a beverage extraction pipe 52. FIG. 4 is a schematic two-view schematically showing the replaceable component 2A for a beverage container according to the first embodiment. A plan view is shown on the upper side of FIG. 4, and a cross-sectional view is shown on the lower side of FIG. 4. FIG. 5 is a schematic perspective view schematically showing how the replaceable component 2A for a beverage container is formed. FIG. 6 is a schematic two-view schematically showing a protective sheet 60. A plan view is shown on the upper side of FIG. 6, and a side view is shown on the lower side of FIG. 6.

In an example shown in FIG. 2, the beverage container 4 includes a beverage container main body 40 and a beverage extraction pipe 52 inserted into the beverage container main body 40. The beverage container main body 40 defines a space for accommodating a bag 30. The beverage container main body 40 is made of, for example, stainless steel. The beverage extraction pipe 52 is used to take out a beverage D stored in the bag 30 in the beverage container 4 to the outside of the beverage container 4. In the example shown in FIG. 2, a lower end of the beverage extraction pipe 52 is arranged below an intermediate portion in a height direction of the beverage container main body 40. The lower end of the beverage extraction pipe 52 is preferably arranged adjacent to a bottom portion of the beverage container main body 40. The length of the beverage extraction pipe 52 is, for example, 5 cm or more, 10 cm or more, 15 cm or more, or 20 cm or more. The beverage extraction pipe 52 is made of, for example, stainless steel.

The beverage container 4 may include a beverage valve V1 and/or a gas valve V2. The beverage valve V1 is a valve that can change states between an open state that allows passage of the beverage and a closed state that prohibits the passage of the beverage. Further, the gas valve V2 is a valve that can change states between an open state that allows passage of a gas and a closed state that prohibits the passage of the gas. The beverage container 4 may include a bottom protector 47 that protects a bottom portion of the beverage container main body 40 and/or a top protector 48 that protects a top portion or a mouth portion 44 of the beverage container main body 40. The bottom protector 47 and/or the top protector 48 is attached to the beverage container main body 40 by welding or the like.

In the example shown in FIG. 2, the replaceable component 2A for a beverage container is attached to the above-mentioned beverage extraction pipe 52. The replaceable component 2A includes a tubular member 20 and the bag 30 for containing the beverage D.

Next, with reference to FIG. 3, a procedure for attaching the replaceable component 2A for a beverage container to the beverage extraction pipe 52 will be described. The replaceable component 2A for a beverage container is attachable to the beverage extraction pipe 52. In an example shown in FIG. 3, a lower end 52*e* of the beverage extraction pipe 52 is inserted into the tubular member 20 of the replaceable component 2A, and then the tubular member 20 is slid along a longitudinal direction of the beverage extraction pipe 52. Thereby, the replaceable component 2A (more specifically, the tubular member 20) is attached to the beverage extraction pipe 52. In the example shown in FIG. 3, the bag 30 is attached to the tubular member 20. Therefore, when the tubular member 20 is attached to the beverage extraction pipe 52, the bag 30 is supported by the beverage extraction pipe 52 via the tubular member 20. Note that, in this specification, "slide" means a slide movement relative to the beverage extraction pipe 52. Therefore, the "slide" includes both sliding the tubular member 20 with respect to the beverage extraction pipe 52 and sliding the beverage extraction pipe 52 with respect to the tubular member 20.

In the example shown in FIG. 3, the tubular member 20 is slidable along the longitudinal direction of the beverage extraction pipe 52. From the viewpoint of preventing the beverage from leaking from a gap between an inner circumferential surface 20*n* of the tubular member 20 and an outer circumferential surface 52*u* of the beverage extraction pipe 52, the tubular member 20 (more specifically, the inner circumferential surface 20*n* of the tubular member 20) is configured to be in annular contact with the outer circumferential surface 52*u* of the beverage extraction pipe 52 after the tubular member 20 is attached to the beverage extraction pipe 52. In other words, the inner circumferential surface 20*n* of the tubular member 20 and the outer circumferential surface 52*u* of the beverage extraction pipe 52 form an annular contact region.

The replaceable component 2A for a beverage container according to the first embodiment includes the tubular member 20 that can slide along the longitudinal direction of the beverage extraction pipe 52 and can be in annular contact with the outer circumferential surface 52*u* of the beverage extraction pipe 52. Therefore, the replaceable component 2A provided with the tubular member 20 and the bag 30 can be easily attached to the beverage extraction pipe 52. More specifically, the replaceable component 2A can be attached to the beverage extraction pipe 52 by inserting the lower end 52*e* of the beverage extraction pipe 52 into the tubular member 20 and sliding the tubular member 20 along the longitudinal direction of the beverage extraction pipe 52.

In the example shown in FIG. 2, the combination of the replaceable component 2A for a beverage container and the beverage container 4 is a combination after the replaceable component 2A for a beverage container is attached to the beverage container 4 (more specifically, the beverage extraction pipe 52). Alternatively, the combination of the replaceable component 2A for a beverage container and the beverage container 4 according to the first embodiment may be a combination before the replaceable component 2A for a beverage container is attached to the beverage container 4 (more specifically, the beverage extraction pipe 52). In other words, the combination may be in a state in which the replaceable component 2A and the beverage container 4 are provided as parts to be combined.

Subsequently, referring to FIGS. 2 to 6, an optional configuration that can be adopted in the first embodiment will be described.

(Tubular Member 20)

In an example shown in FIG. 4, the tubular member 20 includes an annular seal portion 23 that contacts the outer circumferential surface 52*u* of the beverage extraction pipe 52. The seal portion 23 is made of a material softer than a material of a tubular member main body 25 described later. In other words, the elastic modulus of the seal portion 23 is lower than the elastic modulus of the tubular member main body 25. The seal portion 23 is made of, for example, an elastic material such as silicone rubber. When the tubular member 20 includes the seal portion 23, it is more reliable to prevent the beverage from leaking from between the tubular member 20 and the outer circumferential surface 52*u* of the beverage extraction pipe 52. Further, when the tubular member 20 includes the seal portion 23, a frictional force acting between the inner circumferential surface of the tubular member 20 (more specifically, an inner circumferential surface 23*n* of the seal portion 23) and the outer circumferential surface 52*u* of the beverage extraction pipe 52 increases. In this case, it is more reliably prevented that the tubular member 20 is unintentionally detached from the beverage extraction pipe 52.

In the example shown in FIG. 4, the tubular member 20 has a tubular portion 26 and a flange portion 27. The tubular portion 26 and the flange portion 27 constitute the tubular member main body 25. The tubular member main body 25 is made of, for example, synthetic resin such as polyethylene or polypropylene.

The tubular portion 26 has, for example, a cylindrical shape. The flange portion 27 has an inner edge 27*n* connected to the tubular portion 26 and an outer edge 27*u*.

The tubular portion 26 functions as a guided portion guided by the beverage extraction pipe 52 when the tubular member 20 moves along the longitudinal direction of the beverage extraction pipe 52. Further, when the tubular member 20 has the seal portion 23, the tubular portion 26 functions as a holding portion for holding the seal portion 23. The seal portion 23 may be arranged on the tubular member main body 25 (more specifically, the tubular portion 26) after the tubular member main body 25 having the tubular portion 26 and the flange portion 27 is formed. Arranging the seal portion 23 on the tubular member main body 25 may be executed by molding the seal portion 23 in a mold containing the tubular member main body 25 molded in advance. Alternatively, the seal portion 23 and the tubular member main body 25 may be molded at the same time in a mold.

From the viewpoint of arranging the seal portion 23 on the tubular portion 26, a lower end portion 26*b* of the tubular portion 26 may be thicker than an upper end portion 26*a* of the tubular portion 26. In this case, the lower end portion 26*b* may be provided with an annular recess portion in which the seal portion 23 is arranged. The length of the tubular portion 26 in a direction along a central axis Cl of the tubular portion is, for example, about 18 mm (14 mm or more and 30 mm or less).

The flange portion 27 functions as an attachment portion (more specifically, a welding portion) for attaching the bag 30. The welding between the flange portion 27 and the bag 30 is, for example, high frequency welding. Alternatively, the welding between the flange portion 27 and the bag 30 may be thermal welding or ultrasonic welding. From the viewpoint of facilitating welding between the flange portion 27 and the bag 30, the material of the flange portion 27 is preferably the same as the material of the bag 30. In the example shown in FIG. 4, the flange portion 27 has a ring shape in a plan view (in other words, when viewed in the direction along the central axis Cl of the tubular portion 26). In the example shown in FIG. 4, the flange portion 27 and a portion around a through hole 31*h* of the bag 30 are welded together. Further, in the example shown in FIG. 4, the bag 30 is welded to an upper surface of the flange portion 27. Alternatively, the bag 30 may be welded to a lower surface of the flange portion.

From the viewpoint of facilitating attachment (more specifically, welding) between the flange portion 27 and the bag 30, a difference between a diameter of the outer edge 27*u* of the flange portion 27 and a diameter of the inner edge 27*n* of the flange portion 27 is preferably 6 mm or more, 8 mm or more, or 10 mm or more. Further, from the viewpoint of making the size of the flange portion 27 compact, the difference between the diameter of the outer edge 27*u* of the flange portion 27 and the diameter of the inner edge 27*n* of the flange portion 27 is preferably 18 mm or less. In the example shown in FIG. 4, the diameter of the inner edge 27*n* of the flange portion 27 is about 25 mm (24 mm or more and 26 mm or less). Further, the diameter of the outer edge 27*u* of the flange portion 27 is about 38 mm (37 mm or more and 39 mm or less). From the viewpoint of smoothly inserting the bag 30 attached to the tubular member 20 into the beverage container 4, the diameter of the outer edge 27*u* of the flange portion 27 is preferably sufficiently smaller than the minimum inner diameter of the mouth portion 44 of the beverage container 4. The minimum inner diameter of the mouth portion 44 of the beverage container 4 is, for example, about 45 mm. Therefore, the diameter of the outer edge 27*u* of the flange portion 27 is preferably 39 mm or less.

The flange portion 27 may function as a grip portion that is gripped when the tubular member 20 is slid and moved along the longitudinal direction of the beverage extraction pipe 52.

(Bag 30)

The bag 30 is made of, for example, synthetic resin such as polyethylene or polypropylene. The bag 30 may be composed of any one of a high-density polyethylene layer, a low-density polyethylene layer, a polyethylene terephthalate layer, and a nylon layer, or may be composed of a laminate of these layers. Further, the bag 30 may be constituted by a laminated film in which a light-shielding layer or an oxygen barrier layer such as an aluminum foil or an aluminum vapor deposition layer is placed between a plurality of synthetic resin layers in order to secure light-shielding property and/or oxygen barrier property. Further, the bag 30 may be constituted by a laminated film in which an oxygen barrier layer such as an ethylene vinyl alcohol copolymer is placed between a plurality of synthetic resin layers. The bag 30 may be constituted by a laminated film including a nylon layer, a polyethylene layer, and an aluminum layer. Note that the material of the bag 30 is not limited to the above-mentioned examples. In an example shown in FIG. 5, the bag 30 is formed by welding a first sheet 31 and a second sheet 32. The first sheet 31 is, for example, a circular sheet having a through hole 31*h* into which a beverage extraction pipe 52 can be inserted. Further, the second sheet 32 is, for example, a non-perforated circular sheet in which no hole is formed. By welding an inner peripheral portion of the first sheet 31 (in other words, the portion around the through hole 31*h*) and the above-mentioned flange portion 27, the first sheet 31 and the tubular member 20 are integrated. Further, an outer peripheral portion 31*e* of the first sheet 31 and an outer peripheral portion 32*e* of the second sheet 32 are welded in an annular shape to form the bag 30. Alternatively, the bag 30 may be formed by using three sheets (for example, the first sheet 31 having the through hole 31*h*, the second sheet 32, and a cylindrical sheet).

(Protective Sheet 60)

As shown in FIG. 2, the replaceable component 2A for a beverage container may have a protective sheet 60 placed above the bag 30. The protective sheet 60 prevents or suppresses the bag 30 from coming in contact with a through hole portion 54*h* or the like of a fitting 50. In the example shown in FIG. 2, if the bag 30 comes in contact with the through hole portion 54*h* or the like, the bag 30 may be damaged. On the other hand, when the protective sheet 60 is placed above the bag 30, the bag 30 is protected by the protective sheet 60, and the damage to the bag 30 is prevented or suppressed. It is preferable that the protective sheet 60 is not a bag, in other words, the protective sheet 60 is a non-bag-shaped protective sheet. Note that the protective sheet 60 may be omitted when possibility of damage to the bag 30 is low.

In addition, in this specification, "fitting" means a member attached to a mouth portion of a beverage container and used to fill an inside of the beverage container with a beverage and/or to take out the beverage from the inside of the beverage container. The fitting 50 has a tubular attachment portion 51 to be attached to the mouth portion 44 of the beverage container 4. In the example shown in FIG. 2, the attachment portion 51 is attached to the mouth portion 44 by threaded engagement formed between a male threaded portion 51*s* formed on the attachment portion 51 and a female threaded portion formed on the mouth portion 44. It is preferable that the attachment portion 51 is provided with an engaging portion 51*g* with which a dispense head (not shown in FIG. 2) for taking out the beverage from the beverage container 4 is engaged. In the example shown in FIG. 2, the engaging portion 51*g* is an engaging projection. In the example shown in FIG. 2, the attachment portion 51 has an inclined surface 51*k* that is inclined with respect to a central axis C of the attachment portion 51. The inclined surface 51*k* functions as a valve seat portion VB2 of the gas valve V2.

Further, the fitting 50 includes the beverage extraction pipe 52 arranged in the beverage container main body 40. The fitting 50 may include the beverage valve V1 and the gas valve V2. In the example shown in FIG. 2, the fitting 50 includes an outer cylindrical portion 54 arranged outside the beverage extraction pipe 52. A plurality of the through hole portions 54*h* are formed in the outer cylindrical portion 54.

The attachment portion 51, the beverage extraction pipe 52, and the outer cylindrical portion 54 are made of, for example, stainless steel. The beverage extraction pipe 52 made of stainless steel (or the fitting 50 including the beverage extraction pipe 52) is a part that can be reused after being cleaned.

In an example shown in FIG. 6, the protective sheet 60 has a through hole 60*h* into which the beverage extraction pipe 52 is inserted. From the viewpoint of preventing the protective sheet 60 from being bitten between the mouth portion 44 and the fitting 50, the distance L1 from a center of the through hole 60*h* to an outermost edge 60*e* of the protective sheet 60 is preferably set to a distance at which the outermost edge 60*e* of the protective sheet 60 does not reach the mouth portion 44 when the fitting 50 is attached to the mouth portion 44 (See FIG. 2 if necessary). More specifically, the distance L1 is preferably about 7 cm (5 cm or more and 9 cm or less).

In the example shown in FIG. 6, the protective sheet 60 is a circular sheet. Further, the through hole 60*h* is formed in the circular sheet. The protective sheet 60 may be made of synthetic resin or may be made of another material (for example, cloth).

In the example shown in FIG. 2, the protective sheet 60 is a separate body from the bag 30 (in other words, the protective sheet 60 is not fixed to the bag 30).

Alternatively, an inner edge portion of the protective sheet 60 (in other words, a portion around the through hole 60*h*) may be welded to the portion around the through hole 31*h* of the bag 30 or the flange portion 27 of the tubular member 20.

(Position where the Tubular Member 20 is Attached to the Beverage Extraction Pipe 52)

In the example shown in FIG. 2, the beverage extraction pipe 52 has a shoulder portion 53*c*. In the example shown in FIG. 2, the shoulder portion 53*c* supports a spring member 55 that biases the valve body of the beverage valve V1 upward (in other words, the shoulder portion 53*c* functions as a spring receiver that supports the spring member 55.). Further, the beverage extraction pipe 52 has a small-diameter pipe portion 53*b* (first pipe portion) arranged below the shoulder portion 53*c* and a large-diameter pipe portion 53*a* (second pipe portion) arranged above the shoulder portion 53*c*. Note that the small-diameter pipe portion 53*b* (the first pipe portion) is a pipe portion having a smaller outer diameter than an outer diameter of the large-diameter pipe portion 53*a* (the second pipe portion), and the large-diameter pipe portion 53*a* (the second pipe portion) is a pipe portion having a larger outer diameter than the outer diameter of the small-diameter pipe portion 53*b* (the first pipe portion).

In the example shown in FIG. 2, the minimum inner diameter (more specifically, an inner diameter of the seal portion 23) of the tubular member 20 before being attached to the beverage extraction pipe 52 is preferably smaller than the outer diameter of the large-diameter pipe portion 53*a* of the beverage extraction pipe 52. In this case, after the tubular member 20 is attached to an outer circumferential surface of the large-diameter pipe portion 53*a*, the tubular member 20 is held by the large-diameter pipe portion 53*a* by an elastic force that causes the tubular member 20 (more specifically, the seal portion 23) to return to its original shape.

In the example shown in FIG. 2, the tubular member 20 is attached to the large-diameter pipe portion 53*a* so as to be in annular contact with the beverage extraction pipe 52 at the large-diameter pipe portion 53*a*. When the tubular member 20 is attached to the large-diameter pipe portion 53*a*, a position of the tubular member 20 in a height direction is relatively high. Therefore, it is possible to fill the inside the bag 30 with more beverage D.

Second Embodiment

Figure 7:
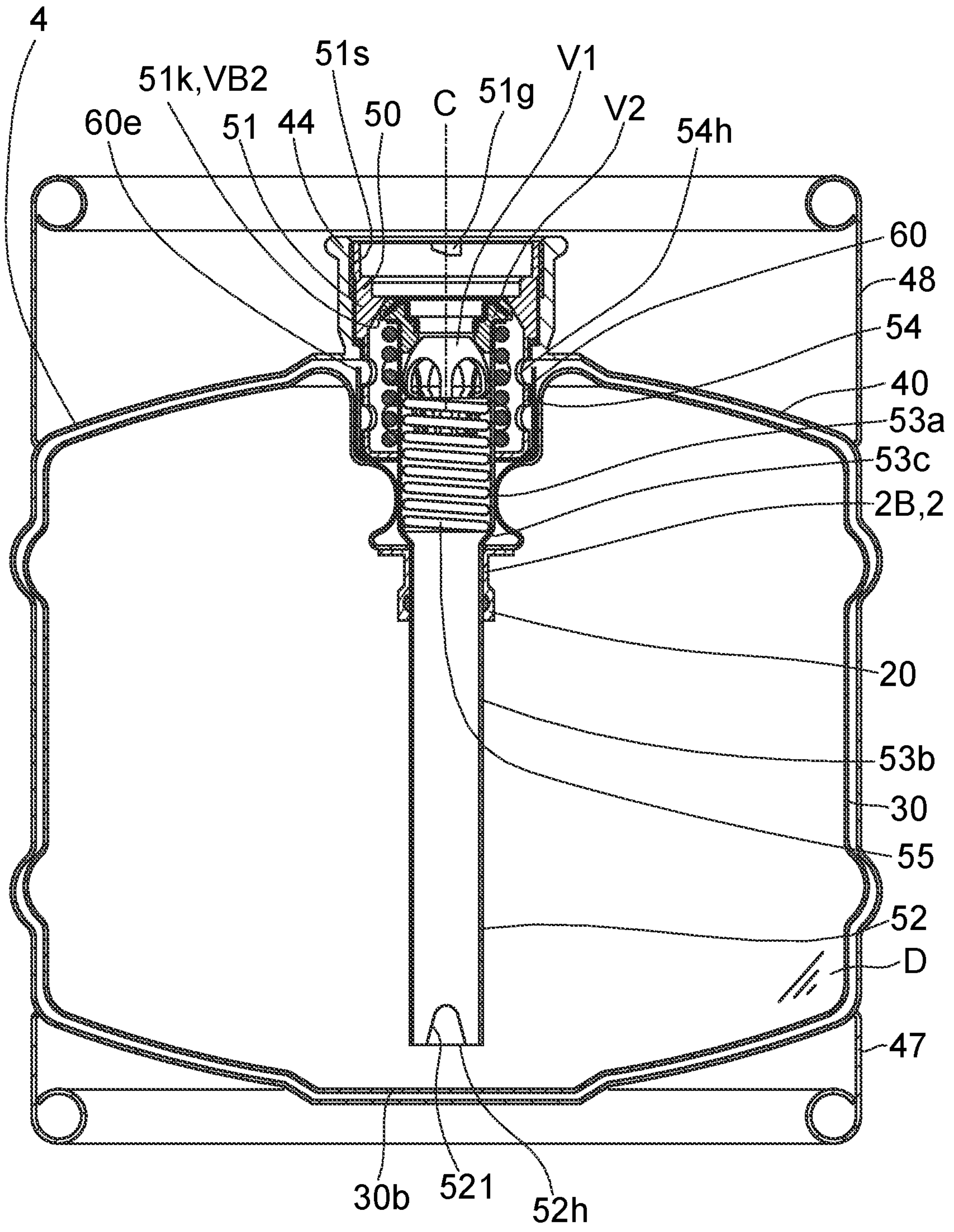
FIG. 7 is a schematic cross-sectional view schematically showing a combination of a replaceable component for a beverage container and a beverage container according to a second embodiment.
Figure 8:
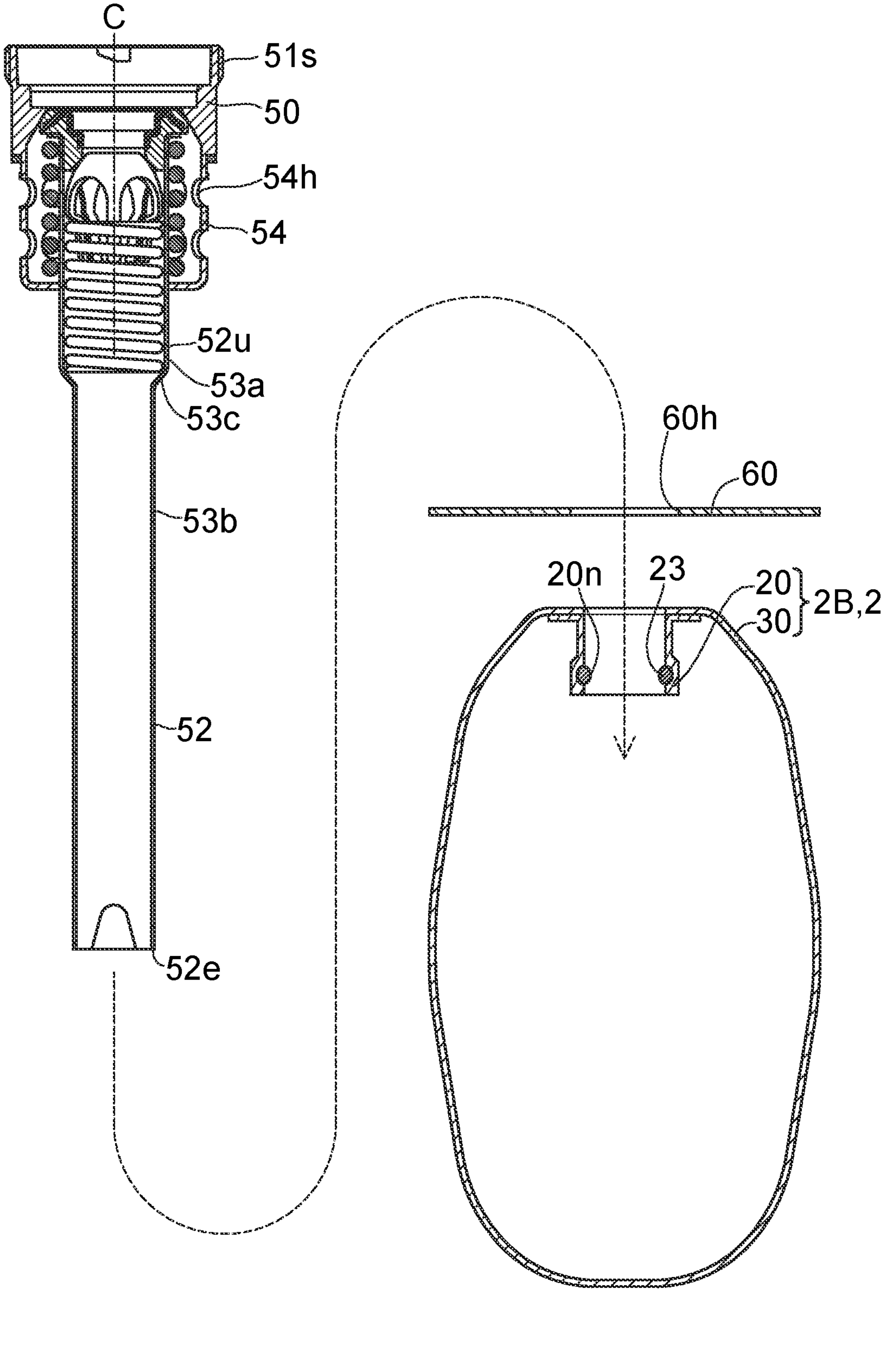
FIG. 8 is a schematic cross-sectional view schematically showing a state before the replaceable component for a beverage container according to the second embodiment is attached to a beverage extraction pipe.
Figure 9:
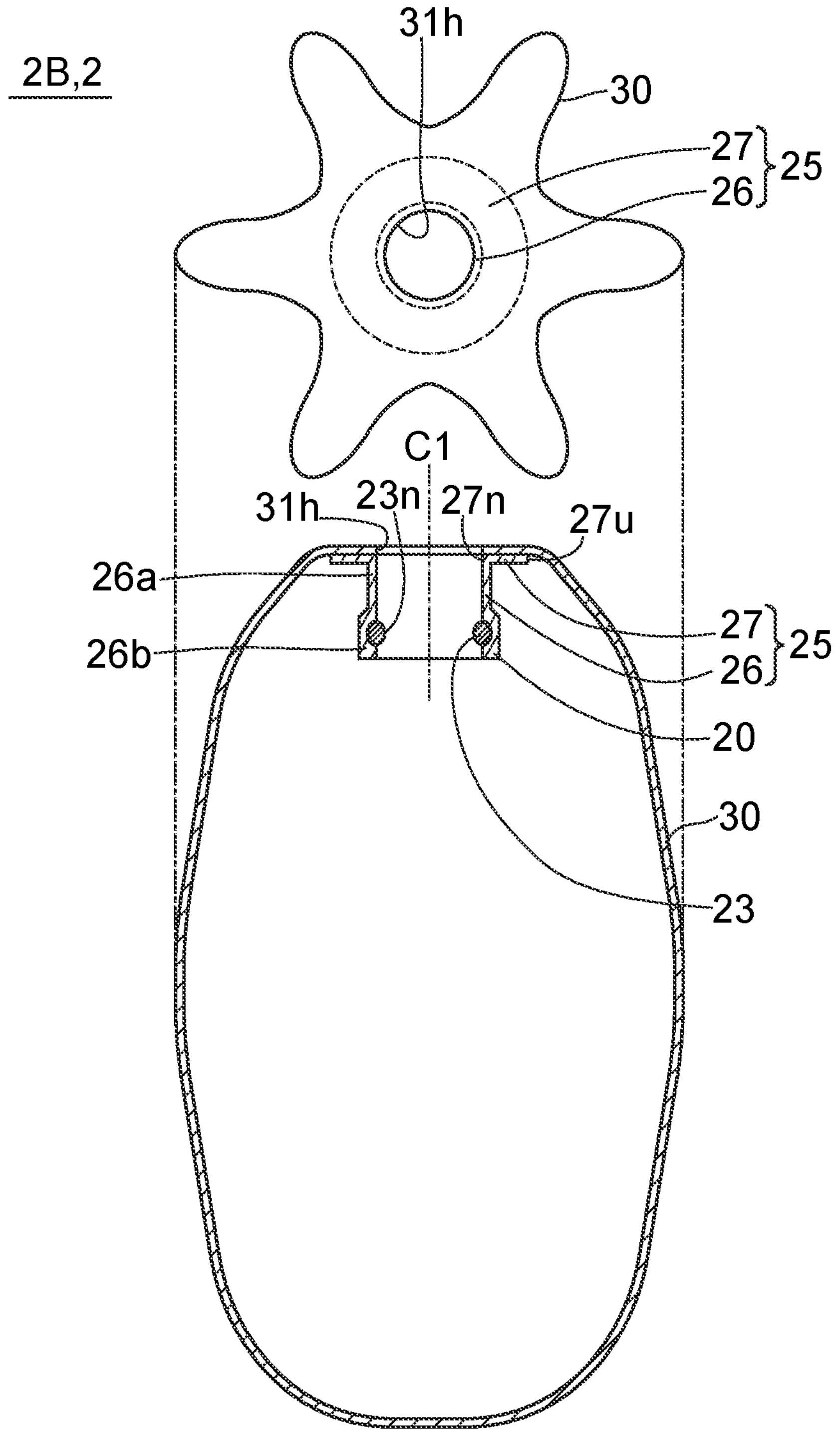
FIG. 9 is a schematic two-view schematically showing the replaceable component for a beverage container according to the second embodiment.

Referring to FIGS. 7 to 9, a replaceable component 2B for a beverage container according to a second embodiment, and a combination of the replaceable component 2B for a beverage container and a beverage container 4 will be described. FIG. 7 is a schematic cross-sectional view schematically showing the combination of the replaceable component 2B for a beverage container and the beverage container 4 according to the second embodiment. Note that FIG. 7 shows a state after the replaceable component 2B for a beverage container is attached to the beverage container 4 and the beverage D is filled in the bag 30. FIG. 8 is a schematic cross-sectional view schematically showing a state before the replaceable component 2B for a beverage container according to the second embodiment is attached to a beverage extraction pipe 52. FIG. 9 is a schematic two-view schematically showing the replaceable component 2B for a beverage container according to the second embodiment. A plan view is shown on the upper side of FIG. 9, and a cross-sectional view is shown on the lower side of FIG. 9.

The replaceable component 2B for a beverage container and the combination of the replaceable component 2B for a beverage container and the beverage container 4 according to the second embodiment are different from the replaceable component 2A for a beverage container and the combination of the replaceable component 2A for a beverage container and the beverage container 4 according to the first embodiment in that the replaceable component 2B is a component to be attached to a small-diameter pipe portion 53*b* of a beverage extraction pipe 52. In other respects, the second embodiment is the same as the first embodiment.

In the second embodiment, the differences from the first embodiment will be mainly described. On the other hand, in the second embodiment, a repetitive description of the matters explained in the first embodiment will be omitted. Therefore, it goes without saying that the matters explained in the first embodiment can be applied to the second embodiment even if explanation is not explicitly given in the second embodiment.

A replaceable component 2B for a beverage container according to the second embodiment is a replaceable component attachable to a beverage extraction pipe 52 arranged in the beverage container 4. The replaceable component 2B includes a tubular member 20 and a bag 30. The tubular member 20 is slidable along a longitudinal direction of the beverage extraction pipe 52. Further, the tubular member 20 comes in annular contact with an outer circumferential surface 52*u* of the beverage extraction pipe 52. The bag 30 is a bag for containing a beverage. Additionally, the replaceable component 2B may include a protective sheet 60.

The structures, shapes, and materials of the tubular member 20, the bag 30, and the protective sheet 60 have already been described in the first embodiment. Therefore, a repetitive description of the structures, shapes, and materials of the tubular member 20, the bag 30, and the protective sheet 60 will be omitted.

As the beverage container 4 according to the second embodiment, the same container as the beverage container 4 according to the first embodiment can be used. The beverage container 4 has a beverage container main body 40, a mouth portion 44, and a fitting 50. Further, the fitting 50 includes the beverage extraction pipe 52 arranged in the beverage container main body 40. The structures, shapes, and materials of the beverage container main body 40, the mouth portion 44, the fitting 50, and the beverage extraction pipe 52 have already been described in the first embodiment. Therefore, a repetitive description of the structures, shapes, and materials of the beverage container main body 40, the mouth portion 44, the fitting 50, and the beverage extraction pipe 52 will be omitted.

(Position where the Tubular Member 20 is Attached to the Beverage Extraction Pipe 52)

In an example shown in FIG. 7, the beverage extraction pipe 52 has a shoulder portion 53*c*, a small-diameter pipe portion 53*b* arranged below the shoulder portion 53*c*, and a large-diameter pipe portion 53*a* arranged above the shoulder portion 53*c*.

In the example shown in FIG. 7, the tubular member 20 is attached to the small-diameter pipe portion 53*b* so as to be in annular contact with the small-diameter pipe portion 53*b*. When the tubular member 20 is attached to the small-diameter pipe portion 53*b*, the size of the tubular member 20 can be relatively small. Further, the bag 30 attached to the tubular member 20 can be folded more compactly around the tubular member 20 and the beverage extraction pipe 52. When the bag 30 is compactly folded, the beverage extraction pipe 52 to which the replaceable component 2B is attached can be more smoothly inserted into the beverage container main body 40.

In an example shown in FIG. 9, the tubular member 20 includes a seal portion 23, a tubular portion 26, and a flange portion 27. The structures, shapes, and materials of the seal portion 23, the tubular portion 26, and the flange portion 27 have already been described in the first embodiment. Therefore, a repetitive description of the structures, shapes, and materials of the seal portion 23, the tubular portion 26, and the flange portion 27 will be omitted.

In the example shown in FIG. 9, the length of the tubular portion 26 in a direction along a central axis Cl of the tubular portion is, for example, about 18 mm (14 mm or more and 30 mm or less). In the example shown in FIG. 9, a diameter of an inner edge 27*n* of the flange portion 27 is about 19 mm (18 mm or more and 20 mm or less). A diameter of an outer edge 27*u* of the flange portion 27 is about 35 mm (34 mm or more and 36 mm or less).

In the example shown in FIG. 9, the minimum inner diameter (more specifically, an inner diameter of the seal portion 23) of the tubular member 20 before being attached to the beverage extraction pipe 52 is preferably smaller than an outer diameter of the small-diameter pipe portion 53*b* of the beverage extraction pipe 52. In this case, after the tubular member 20 is attached to an outer circumferential surface of the small-diameter pipe portion 53*b*, the tubular member 20 is held by the small-diameter pipe portion 53*b* by an elastic force that causes the tubular member 20 (more specifically, the seal portion 23) to return to its original shape.

The replaceable component 2B for a beverage container and the combination of the replaceable component 2B for a beverage container and the beverage container 4 according to the second embodiment has the same effect as the replaceable component 2A for a beverage container and the combination of the replaceable component 2A for a beverage container and the beverage container 4 according to the first embodiment.

(Method of Using a Replaceable Component 2 for a Beverage Container)

Figure 10:
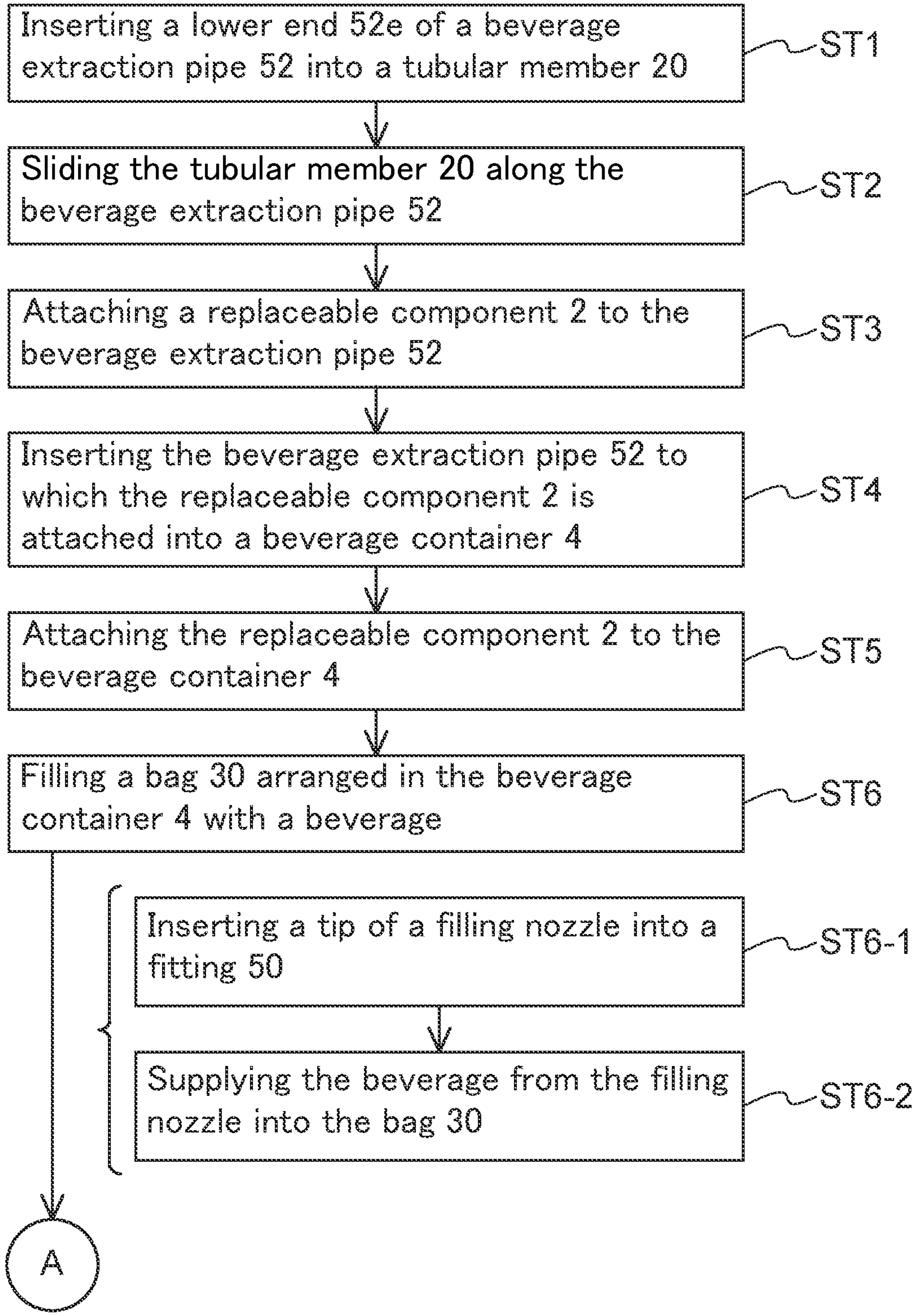
FIG. 10 is a flowchart indicating an example of a method of using a replaceable component for a beverage container according to some embodiments.
Figure 11:
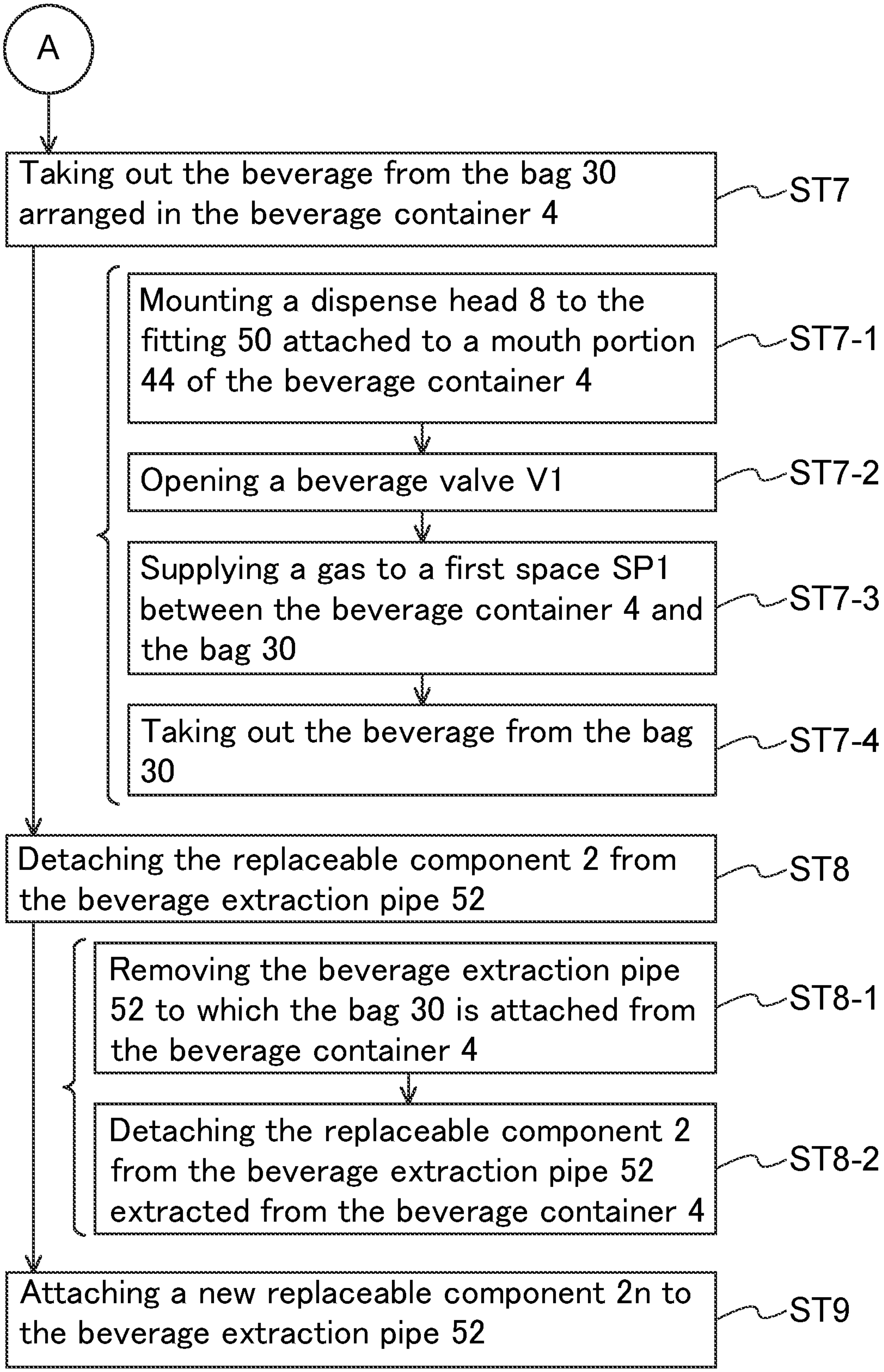
FIG. 11 is a flowchart indicating an example of the method of using a replaceable component for a beverage container according to some embodiments.
Figure 12:
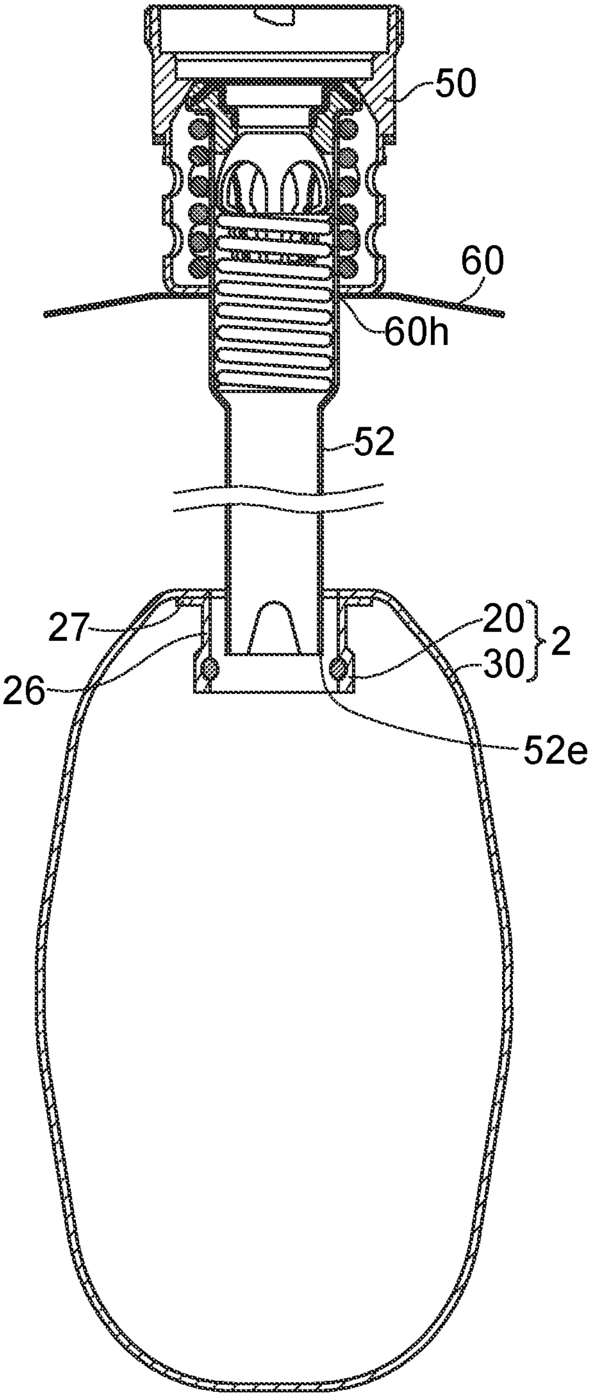
FIG. 12 is a view schematically showing a state after an inserting step is executed.
Figure 13:
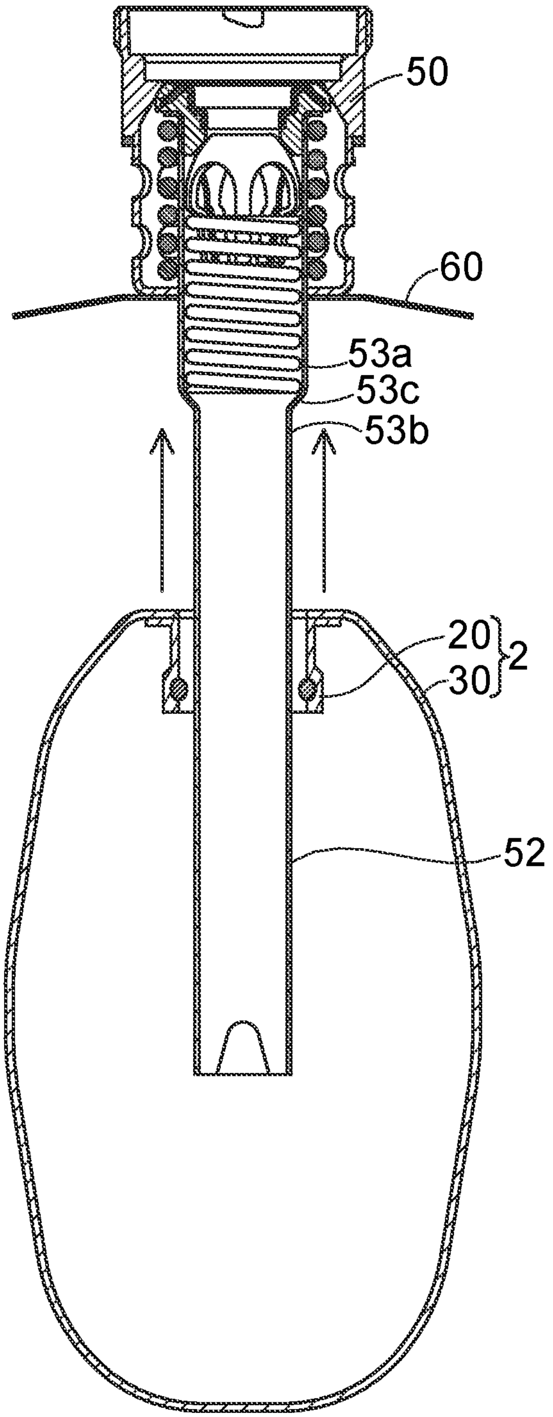
FIG. 13 is a view schematically showing a state in which a moving step is being executed.
Figure 14:
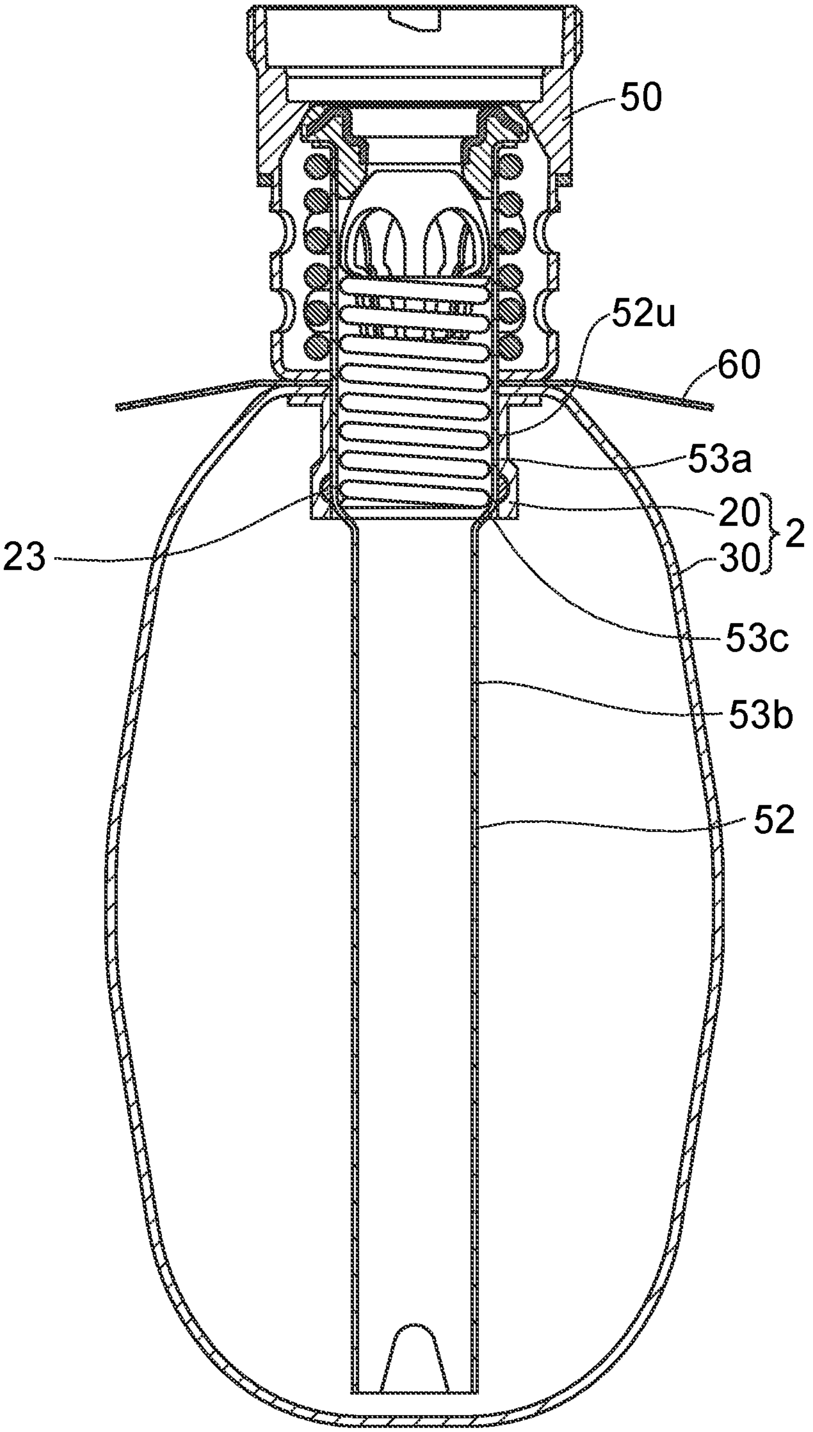
FIG. 14 is a view schematically showing a state after an attaching step is executed.
Figure 15:
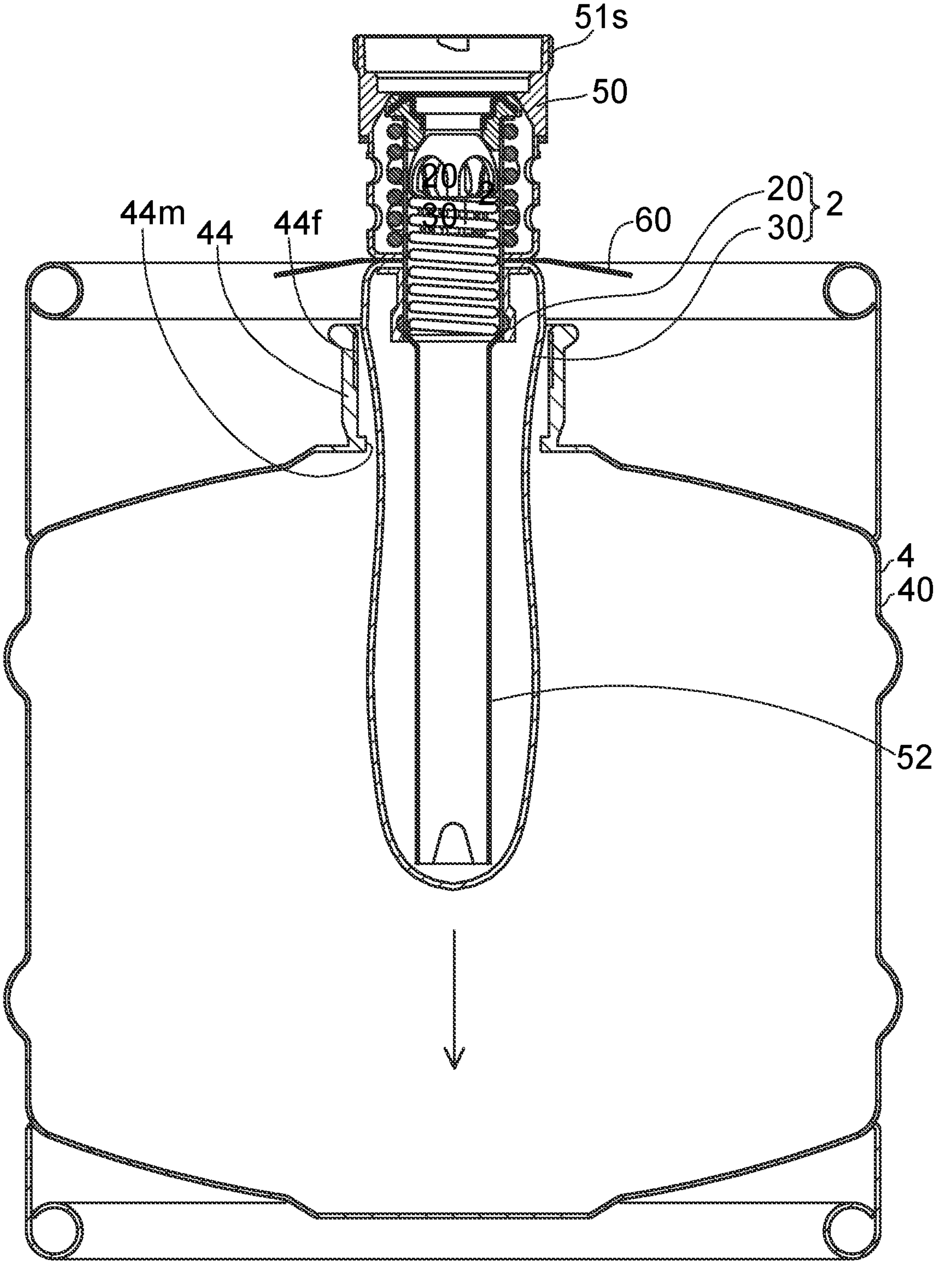
FIG. 15 is a view schematically showing a state in which a second inserting step is being executed.
Figure 16:
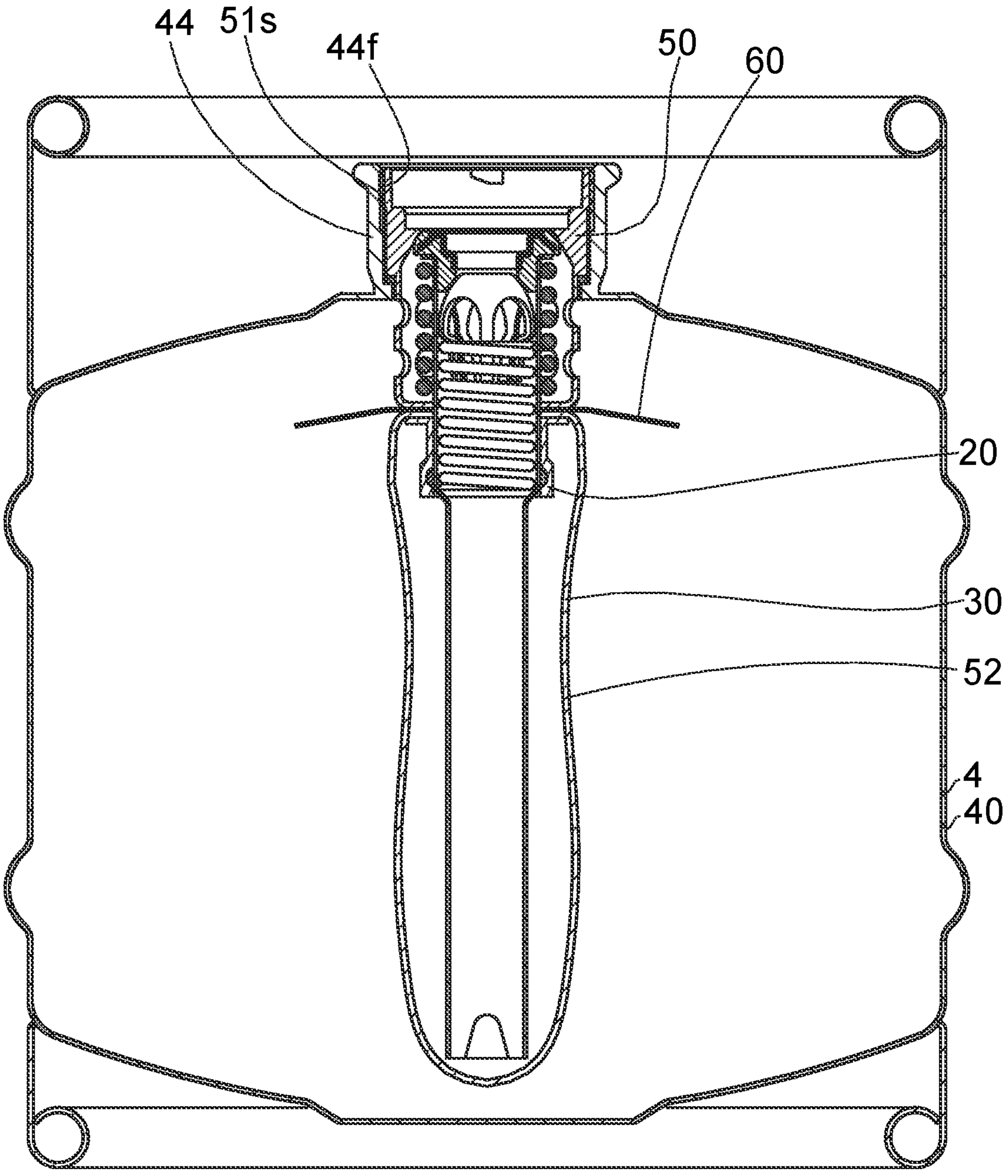
FIG. 16 is a view schematically showing a state after a second attaching step is executed.
Figure 17:
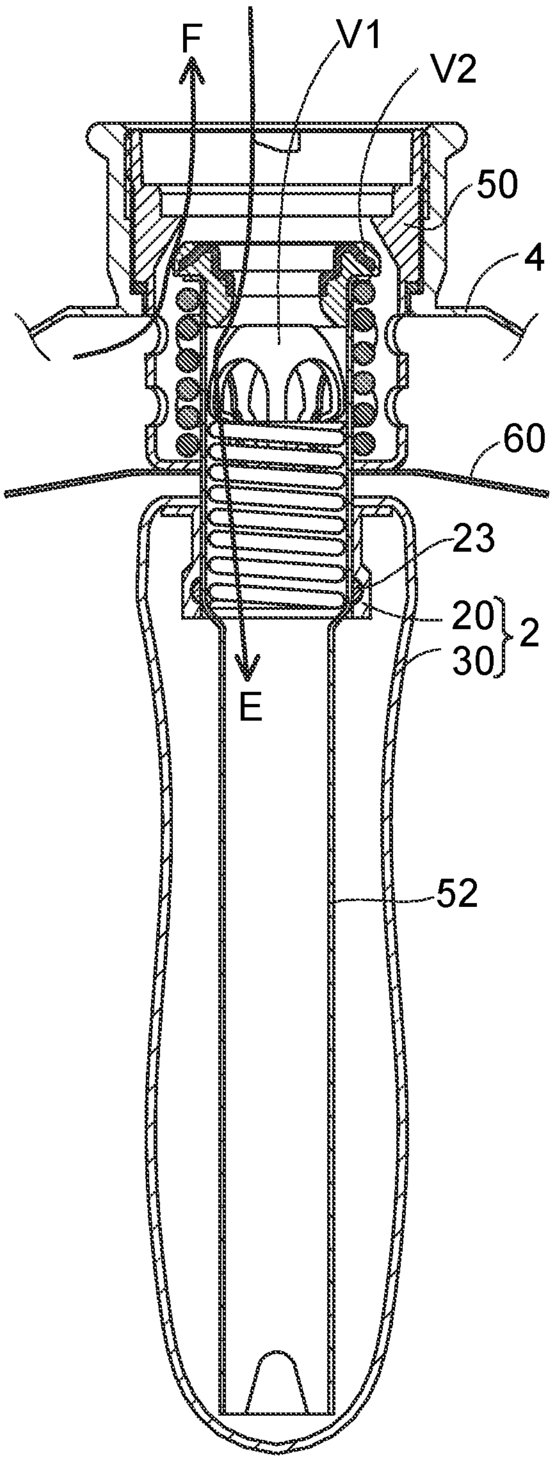
FIG. 17 is a view schematically showing a state in which a beverage filling step is being executed.
Figure 18:
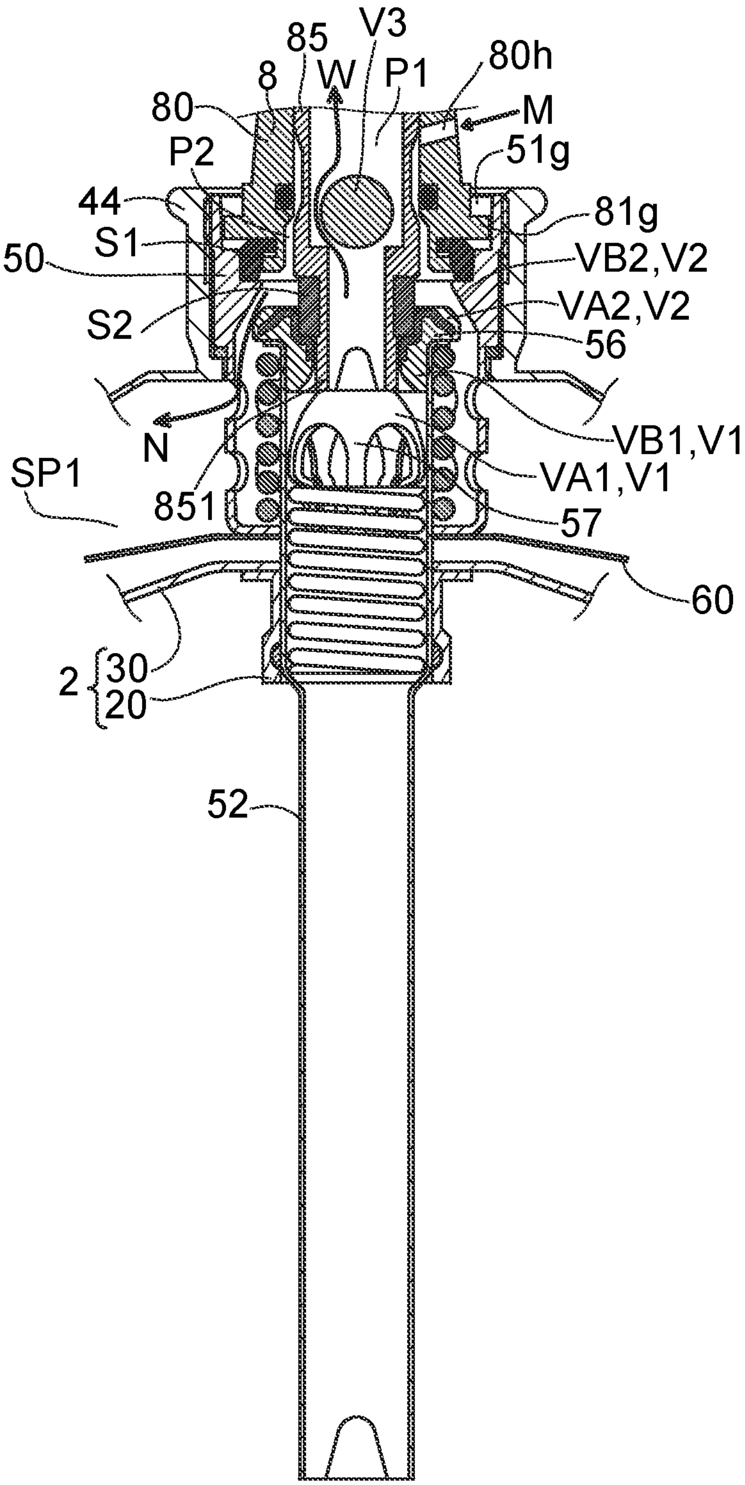
FIG. 18 is a view schematically showing a state in which a beverage extraction step is being executed.
Figure 19:
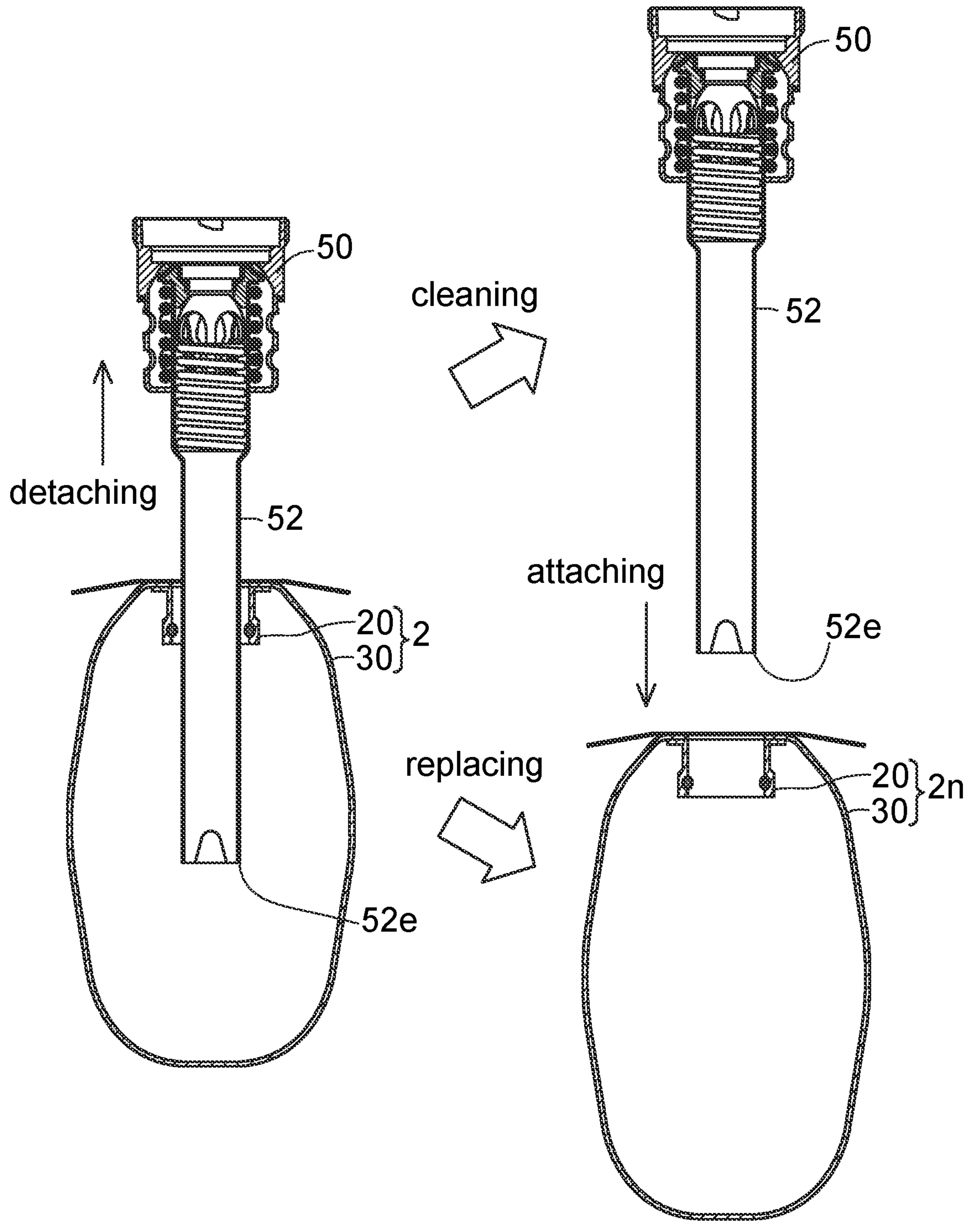
FIG. 19 is a view schematically showing that a new replaceable component for a beverage container is being attached to a beverage extraction pipe after the beverage extraction pipe is cleaned.

Subsequently, a method of using a replaceable component 2 for a beverage container according to some embodiments will be described with reference to FIGS. 2 to 19. FIGS. 10 and 11 are flowcharts indicating an example of a method of using the replaceable component 2 for a beverage container according to some embodiments. FIG. 12 is a view schematically showing a state after an inserting step is executed. FIG. 13 is a view schematically showing a state in which a moving step is being executed. FIG. 14 is a view schematically showing a state after an attaching step is executed. FIG. 15 is a view schematically showing a state in which a second inserting step is being executed. FIG. 16 is a view schematically showing a state after a second attaching step is executed. FIG. 17 is a view schematically showing a state in which a beverage filling step is being executed. FIG. 18 is a view schematically showing a state in which a beverage extraction step is being executed. FIG. 19 is a view schematically showing that a new replaceable component 2*n* for a beverage container is being attached to a beverage extraction pipe 52 after the beverage extraction pipe is cleaned.

A replaceable component used in a method of using a replaceable component 2 for a beverage container according to some embodiments may be the replaceable component 2A for a beverage container according to the first embodiment, the replaceable component 2B for a beverage container according to the second embodiment, a replaceable component 2C for a beverage container according to a third embodiment described later, or another replaceable component for a beverage container.

The replaceable component 2 for a beverage container includes a tubular member 20 and a bag 30 attached to the tubular member 20. The replaceable component 2 may include a protective sheet 60. Since the tubular member 20, the bag 30, and the protective sheet 60 have already been described in the first embodiment and the second embodiment, a repetitive description of these members will be omitted.

A beverage container 4 to which the replaceable component 2 for a beverage container is attached includes a beverage container main body 40, a mouth portion 44, and a fitting 50 (more specifically, a beverage extraction pipe 52). Since the beverage container main body 40, the mouth portion 44, the fitting 50, and the beverage extraction pipe 52 have already been described in the first embodiment and the second embodiment, a repetitive description of these members will be omitted.

In a first step ST1, a lower end 52*e* of the beverage extraction pipe 52 is inserted into the tubular member 20. The first step ST1 is an inserting step. FIG. 12 shows a state after the first step ST1 is executed. By executing the first step ST1, the lower end 52*e* of the beverage extraction pipe 52 is arranged inside the tubular member 20.

In an example shown in FIG. 12, the bag 30 is attached to the tubular member 20 (more specifically, the flange portion 27) by welding or the like before the execution of the first step ST1. In this case, in the first step ST1, the lower end 52*e* of the beverage extraction pipe 52 is inserted into the tubular member 20 with the bag 30 attached.

When the replaceable component 2 includes the protective sheet 60, the beverage extraction pipe 52 is inserted into a through hole 60*h* of the protective sheet 60 before the execution of the first step ST1 (the inserting step) or at the same time as the execution of the first step ST1. After that, the protective sheet 60 is arranged on an upper part of the beverage extraction pipe 52.

In a second step ST2, the tubular member 20 is slid. The second step ST2 is a moving step. In the second step ST2 (the moving step), the tubular member 20 is slid along a longitudinal direction of the beverage extraction pipe 52 such that a part of the beverage extraction pipe 52 protrudes from a lower end of the tubular member 20. FIG. 13 shows a state in which the second step ST2 is being executed.

In FIG. 13, the beverage extraction pipe 52 functions as a guide member that guides a sliding movement of the tubular member 20. In this case, the sliding movement of the tubular member 20 is smoothly executed. When the replaceable component 2B according to the second embodiment is used, the tubular member 20 is slid relative to the beverage extraction pipe 52 in a state where the tubular member 20 and the beverage extraction pipe 52 (more specifically, a small-diameter pipe portion 53*b*) are in annular contact with each other.

In a third step ST3, the replaceable component 2 is attached to the beverage extraction pipe 52. The third step ST3 is an attaching step. In the third step ST3 (the attaching step), the replaceable component 2 (more specifically, the tubular member 20) is attached to the beverage extraction pipe 52 such that a state in which an outer circumferential surface 52*u* of the beverage extraction pipe 52 and the tubular member 20 are in an annular contact is maintained. FIG. 14 shows a state after the third step ST3 is executed.

When the replaceable component 2A according to the first embodiment is used, in the third step ST3 (the attaching step), the tubular member 20 is attached to a large-diameter pipe portion 53*a* of the beverage extraction pipe 52, and the tubular member 20 is held by the large-diameter pipe portion 53*a*. On the other hand, when the replaceable component 2B according to the second embodiment is used, in the third step ST3 (the attaching step), the tubular member 20 is attached to the small-diameter pipe portion 53*b* of the beverage extraction pipe 52, and the tubular member 20 is held by the small-diameter pipe portion 53*b*.

In an example shown in FIG. 14, the third step ST3 (the attaching step) is executed by sliding the tubular member 20 along the longitudinal direction of the beverage extraction pipe 52 to an attaching position of the tubular member 20. Therefore, the tubular member 20 can be easily attached to the beverage extraction pipe 52. When the replaceable component 2A according to the first embodiment is used, the attaching position of the tubular member 20 is a position facing the large-diameter pipe portion 53*a*. On the other hand, when the replaceable component 2B according to the second embodiment is used, the attaching position of the tubular member 20 is a position facing an upper end portion of the small-diameter pipe portion 53*b*.

In the example shown in FIGS. 12 to 14, the tubular member 20 can be attached to the beverage extraction pipe 52 by a series of operations of inserting the beverage extraction pipe 52 into the tubular member 20 and then sliding the tubular member 20 along the longitudinal direction of the beverage extraction pipe 52. Therefore, the tubular member 20 can be attached to the beverage extraction pipe 52 extremely easily and quickly. In the example shown in FIG. 14, the amount of protrusion of the beverage extraction pipe 52 from the lower end of the tubular member 20 is 10 cm or more, or 15 cm or more. In other words, in the third step ST3 (the attaching step), the tubular member 20 is slid by 10 cm or more or 15 cm or more along the longitudinal direction of the beverage extraction pipe 52.

It is preferable that the above-mentioned attaching step (the third step ST3) includes attaching the replaceable component 2 to the beverage extraction pipe 52 by using a frictional force acting between an inner circumferential surface 20*n* of the tubular member 20 and the outer circumferential surface 52*u* of the beverage extraction pipe 52. Note that the attaching of the replaceable component 2 to the beverage extraction pipe 52 by using the frictional force is executable in such a way that, for example, the minimum inner diameter of the tubular member 20 in a natural state is set to be smaller than the outer diameter of the beverage extraction pipe 52 at the attaching position. In the example shown in FIG. 14, the tubular member 20 is not adhered or welded to the beverage extraction pipe 52 in a state where the tubular member 20 is attached to the beverage extraction pipe 52. In this case, in a sub-step ST8-2 described later, work of detaching the replaceable component 2 from the beverage extraction pipe 52 can be easily performed.

In a fourth step ST4, the beverage extraction pipe 52 to which the replaceable component 2 (more specifically, the tubular member 20) is attached is inserted into the beverage container 4 (more specifically, into the beverage container main body 40). The fourth step ST4 is a second inserting step. FIG. 15 shows a state in which the fourth step ST4 is being executed.

The beverage extraction pipe 52 is an elongated member, and its outer diameter is relatively small. Therefore, it is possible to reduce an outer diameter of the replaceable component 2 attached to the beverage extraction pipe 52. More specifically, the outer diameter of the replaceable component 2 can be reduced by folding the bag 30 constituting a part of the replaceable component 2 around the beverage extraction pipe 52. In this case, when the beverage extraction pipe 52 to which the replaceable component 2 is attached is inserted into the beverage container 4, the replaceable component 2 and the beverage extraction pipe 52 smoothly pass through a minimum inner diameter portion 44*m* of the mouth portion 44 of the beverage container 4.

In a fifth step ST5, the replaceable component 2 (more specifically, the tubular member 20) is attached to the beverage container 4. The fifth step ST5 is a second attaching step. The fifth step ST5 (the second attaching step) is executed by attaching the fitting 50 in a state where the replaceable component 2 is attached to the beverage extraction pipe 52, to the mouth portion 44 of the beverage container 4. FIG. 16 shows a state after the fifth step ST5 is executed.

In an example shown in FIG. 16, the attaching of the fitting 50 to the mouth portion 44 is performed by threadably engaging a male threaded portion 51*s* of the fitting 50 with a female threaded portion 44*f* of the mouth portion 44.

By executing the first step ST1 to the fifth step ST5, a double container having the bag 30 which is an inner container and the beverage container 4 which is an outer container whose rigidity is larger than the bag 30 is formed.

Subsequently, a step of filling the bag 30 arranged in the beverage container 4 with a beverage (in other words, a beverage filling method of filling the bag 30 arranged in the beverage container 4 with a beverage) will be described.

After the execution of the fifth step ST5, in a sixth step ST6, the beverage is filled in the bag 30 arranged in the beverage container 4. The sixth step ST6 is a beverage filling step. FIG. 17 shows a state in which the sixth step ST6 (the beverage filling step) is being executed. Note that, in FIG. 17, description of a filling nozzle for filling the bag 30 with the beverage is omitted in order to avoid complication of the drawing.

When filling the bag 30 with the beverage, firstly, in a sub-step ST6-1, a tip of the filling nozzle is inserted into the fitting 50. By inserting the filling nozzle, a beverage valve V1 is opened and a gas valve V2 is opened. Secondly, in a sub-step ST6-2, as shown by the arrow E in FIG. 17, the beverage is supplied into the bag 30 from the filling nozzle via the beverage valve V1 and at the same time, as shown by the arrow F in FIG. 17, a gas (more specifically, air) existing in a space between the beverage container 4 and the bag 30 is discharged to the outside of the beverage container 4 through the gas valve V2. In this way, the beverage is filled in the bag 30.

In an example shown in FIG. 17, the shape of the mouth portion 44 is the same as the shape of the mouth portion of the existing stainless steel beverage container, and the shape of the upper end portion of the fitting 50 is the same as the shape of the upper end portion of the existing fitting 10 (see FIG. 1). Therefore, in the example shown in FIG. 17, it is possible to fill the bag 30 in the beverage container 4 with the beverage using an existing beverage filling system.

Subsequently, a step of taking out the beverage from the bag 30 arranged in the beverage container 4 (in other words, a method of taking out the beverage from the bag 30 arranged in the beverage container 4) will be described.

A seventh step ST7 (in other words, a beverage extraction step) is executed after the beverage filling step (the sixth step ST6). In the seventh step ST7, the beverage is taken out from the bag 30 arranged in the beverage container 4. FIG. 18 shows a state in which the seventh step ST7 (the beverage extraction step) is being executed.

In an example shown in FIG. 18, the extraction of the beverage from the bag 30 is performed via a dispense head 8.

In the beverage extraction step, firstly, in a sub-step ST7-1, the dispense head 8 is mounted to the fitting 50 attached to the mouth portion 44 of the beverage container 4. The mounting is performed, for example, by engaging a second engaging portion 81*g* formed on a main body 80 of the dispense head 8 with an engaging portion 51*g* of the fitting 50.

In the example shown in FIG. 18, the dispense head 8 includes the main body 80 and a plunger member 85 that is movable relative to the main body 80.

The above-mentioned second engaging portion 81*g* is formed at a lower end portion of the main body 80, and a first sealing member S1 (annular sealing member) is held by the lower end portion of the main body 80. When the dispense head 8 is mounted to the fitting 50, the first sealing member S1 seals between the main body 80 and the fitting 50. The main body 80 is provided with a gas inlet hole 80*h* for introducing a gas such as air.

A beverage flow channel P1 is provided inside the plunger member 85. A check valve V3 may be arranged inside the plunger member 85.

On an outer peripheral surface of the plunger member 85, a second sealing member S2 (annular sealing member) that seals between the plunger member 85 and a first valve member 56 is arranged. In the example shown in FIG. 18, the first valve member 56 functions as a valve body VA2 of the gas valve V2 and has a valve seat portion VB1 of the beverage valve V1. A lower end portion of the plunger member 85 has a pressing portion 851 that presses a second valve member 57. In the example shown in FIG. 18, the second valve member 57 functions as a valve body VA1 of the beverage valve V1.

A gas flow channel P2 is provided between the plunger member 85 and the main body 80. When the plunger member 85 is in an upper position, the gas flow channel P2 and the gas inlet hole 80*h* are in a non-communication state. Further, when the plunger member 85 is in the upper position, the pressing portion 851 is separated from the second valve member 57. Further, when the plunger member 85 is in the upper position, the second sealing member S2 is separated from the first valve member 56.

In the beverage extraction step, secondly, in a sub-step ST7-2, the beverage valve V1 is opened. The sub-step ST7-2 is a valve opening step of the beverage valve. The valve opening of the beverage valve V1 is executed, for example, by moving the plunger member 85 from the upper position to a lower position. When the plunger member 85 moves toward the lower position, the pressing portion 851 of the plunger member 85 presses the valve body VA1 of the beverage valve. As a result, the valve body VA1 is separated from the valve seat portion VB1 and the beverage valve V1 is opened.

As shown in FIG. 18, when the plunger member 85 is in the lower position, the second sealing member S2 is in contact with the first valve member 56. In this way, the beverage flow channel P1 of the plunger member 85 and the gas flow channel P2 between the plunger member 85 and the main body 80 are isolated from each other. In the example shown in FIG. 18, when the plunger member 85 moves toward the lower position, the gas valve V2 is also opened. In the example shown in FIG. 18, the second sealing member S2 functions as a pressing portion that presses the valve body VA2 of the gas valve V2.

As shown in FIG. 18, when the plunger member 85 moves toward the lower position, the gas inlet hole 80*h* and the gas flow channel P2 fluidly communicate with each other.

In the beverage extraction step, thirdly, in a sub-step ST7-3, the gas (for example, air) is supplied to a first space SP1 between the beverage container 4 and the bag 30. The gas is supplied via the dispense head 8. The sub-step ST7-3 is a gas supplying step.

More specifically, in the sub-step ST7-3, the gas supplied from a gas supply source (for example, an air pump) is introduced into the gas inlet hole 80*h* (see arrow M in FIG. 18). The gas introduced into the gas inlet hole 80*h* is supplied to the first space SP1 between the beverage container 4 and the bag 30 via the gas flow channel P2 (see arrow N in FIG. 18). The gas supplied to the first space SP1 presses the bag 30 such that the bag 30 is contracted.

In the beverage extraction step, fourthly, in a sub-step ST7-4, the beverage is taken out from the bag 30. The beverage is taken out via the beverage valve V1 and the dispense head 8.

The sub-step ST7-4 will be described in more detail. By executing the above-mentioned sub-step ST7-3 (the gas supplying step), the bag 30 is pressed inward. Therefore, the beverage in the bag 30 goes to the beverage valve V1 through an internal space of the beverage extraction pipe 52. Since the beverage valve V1 is opened in the above-mentioned sub-step ST7-2 (the valve opening step of the beverage valve), the beverage in the internal space of the beverage extraction pipe 52 is taken out to the outside of the dispense head 8 via the beverage valve V1 and the beverage flow channel P1 of the plunger member 85 (see arrow W in FIG. 18).

In the method of taking out the beverage according to some embodiments, the beverage is taken out from the bag 30 by supplying the gas to the first space SP1 between the beverage container 4 and the bag 30. Therefore, the beverage in the bag 30 does not come in contact with the supply gas (for example, air) supplied via the dispense head 8. Therefore, the taste, texture, and the like of the beverage do not deteriorate due to the contact of the beverage with the supplied gas. Further, when the beverage is a sparkling beverage such as beer, the feel of the foam does not deteriorate. Therefore, the quality of the beverage in the bag 30 is maintained at a high quality even after a long period of time (for example, after 4 days or more) has passed since the extraction of the beverage from the bag 30 in the beverage container 4 was started.

Further, in the method of taking out the beverage according to some embodiments, it is possible to use air as the gas supplied to the first space SP1 between the beverage container 4 and the bag 30. Therefore, unlike the conventional method of taking out the beverage, it is not necessary to prepare a carbon dioxide gas cylinder. When preparing the carbon dioxide gas cylinder, it is necessary to prepare a plurality of the carbon dioxide gas cylinders including a spare cylinder. In addition, it is necessary to do work such as monitoring the remaining amount of $CO_2$ in the carbon dioxide gas cylinder, carrying in the carbon dioxide gas cylinder, replacing it, and the like. In addition, a space for placing the plurality of carbon dioxide gas cylinders is also required. On the other hand, in the method of taking out the beverage according to some embodiments, it is only necessary to prepare a small air pump as the gas supply source instead of the plurality of carbon dioxide gas cylinders. Therefore, it is possible to extract the beverage from the bag 30 in the beverage container 4 even in a small store where the space is limited or outdoors. Note that using air as the gas supplied to the first space SP1 is an optional configuration. In other words, in some embodiments, it is not excluded that a gas other than the air (for example, carbon dioxide gas) is used as the gas supplied to the first space SP1 between the beverage container 4 and the bag 30.

When the beverage container 4 is a beverage container 4 made of stainless steel, durability and corrosion resistance of the beverage container 4 are extremely high, and light-shielding property is excellent. Therefore, the beverage container 4 in which the bag 30 is arranged may be stored outdoors.

Subsequently, a step of detaching the replaceable component 2 from the beverage extraction pipe 52 (in other words, a method of detaching the replaceable component to detach the replaceable component 2 from the beverage extraction pipe 52) will be described.

An eighth step ST8 (in other words, a step of detaching the replaceable component) is executed after the beverage extraction step (the seventh step ST7). In the eighth step ST8, the replaceable component 2 is detached from the beverage extraction pipe 52. The drawing on the left side of FIG. 19 shows a state in which the eighth step ST8 (the step of detaching the replaceable component), more specifically, a sub-step ST8-2 described later is being executed.

In the step of detaching the replaceable component, firstly, in a sub-step ST8-1, the beverage extraction pipe 52 to which the bag 30 is attached is removed from the beverage container 4. The removal is performed, for example, by releasing the engagement (more specifically, releasing the threaded engagement) between the mouth portion 44 of the beverage container 4 and the fitting 50, and then pulling the fitting 50 out of the beverage container 4. Needless to say, the dispense head 8 has been removed from the fitting 50 before the execution of the sub-step ST8-1.

In the step of detaching the replaceable component, secondly, in a sub-step ST8-2, the replaceable component 2 is detached from the beverage extraction pipe 52 extracted from the beverage container 4. The step of detaching the replaceable component 2 from the beverage extraction pipe 52 includes sliding the replaceable component 2 (more specifically, the tubular member 20) in a direction toward the lower end 52*e* of the beverage extraction pipe 52 along the beverage extraction pipe 52. Further, the step of detaching the replaceable component 2 from the beverage extraction pipe 52 includes pulling out the beverage extraction pipe 52 from the replaceable component 2 (more specifically, the tubular member 20).

In an example shown in FIG. 19, the replaceable component 2 can be detached from the beverage extraction pipe 52 by simply sliding the replaceable component 2 (more specifically, the tubular member 20) along the beverage extraction pipe 52. Therefore, work of detaching the replaceable component 2 (and work of replacing the replaceable component 2 attached to the beverage extraction pipe 52 with a new replaceable component) can be performed extremely easily and quickly.

Note that the beverage extraction pipe 52 or the fitting 50 from which the replaceable component 2 has been removed and the beverage container 4 are preferably reused in the next beverage filling. FIG. 19 shows that the beverage extraction pipe 52 (or the fitting 50 including the beverage extraction pipe 52) is cleaned and reused.

On the other hand, it is preferable that the replaceable component 2 once used is replaced with a new replaceable component 2*n* (more specifically, a brand-new replaceable component). Since the structure of the replaceable component 2 according to some embodiments is simple, manufacturing cost of the replaceable component 2 is low.

As shown in FIG. 19, in a ninth step ST9, after the beverage extraction pipe 52 (or the fitting 50 including the beverage extraction pipe 52) is cleaned, the new replaceable component 2*n* is attached to the beverage extraction pipe 52. The ninth step ST9 is a reattaching step. The new replaceable component 2*n* is preferably a component having the same shape and structure as the replaceable component 2 removed from the fitting 50 in the sub-step ST8-2.

The beverage extraction pipe 52 (or the fitting 50 including the beverage extraction pipe 52) to which the new replaceable component 2*n* is to be attached in the reattaching step is a part that is cleaned and reused. In this case, total operating cost of the beverage container 4 is reduced. More specifically, by making the expensive beverage container 4 and the fitting 50 reusable and making the inexpensive replaceable component 2 disposable, the total operating cost of the beverage container is reduced.

In the embodiments, the bag 30 is filled with the beverage, and the beverage does not come in direct contact with the reusable beverage container main body 40. Therefore, safety of the beverage is surely ensured. Further, since the beverage does not come in direct contact with the beverage container main body 40 which is to be reused, it is possible to prevent organic substances (dirt) or odors from adhering to the inside of the beverage container main body 40. From the foregoing, it becomes easy to manage the beverage container when the beverage container 4 is collected and reused. Moreover, it is possible to simplify a process of cleaning the beverage container 4.

(Beverage Intake Part 70)

Figure 20:
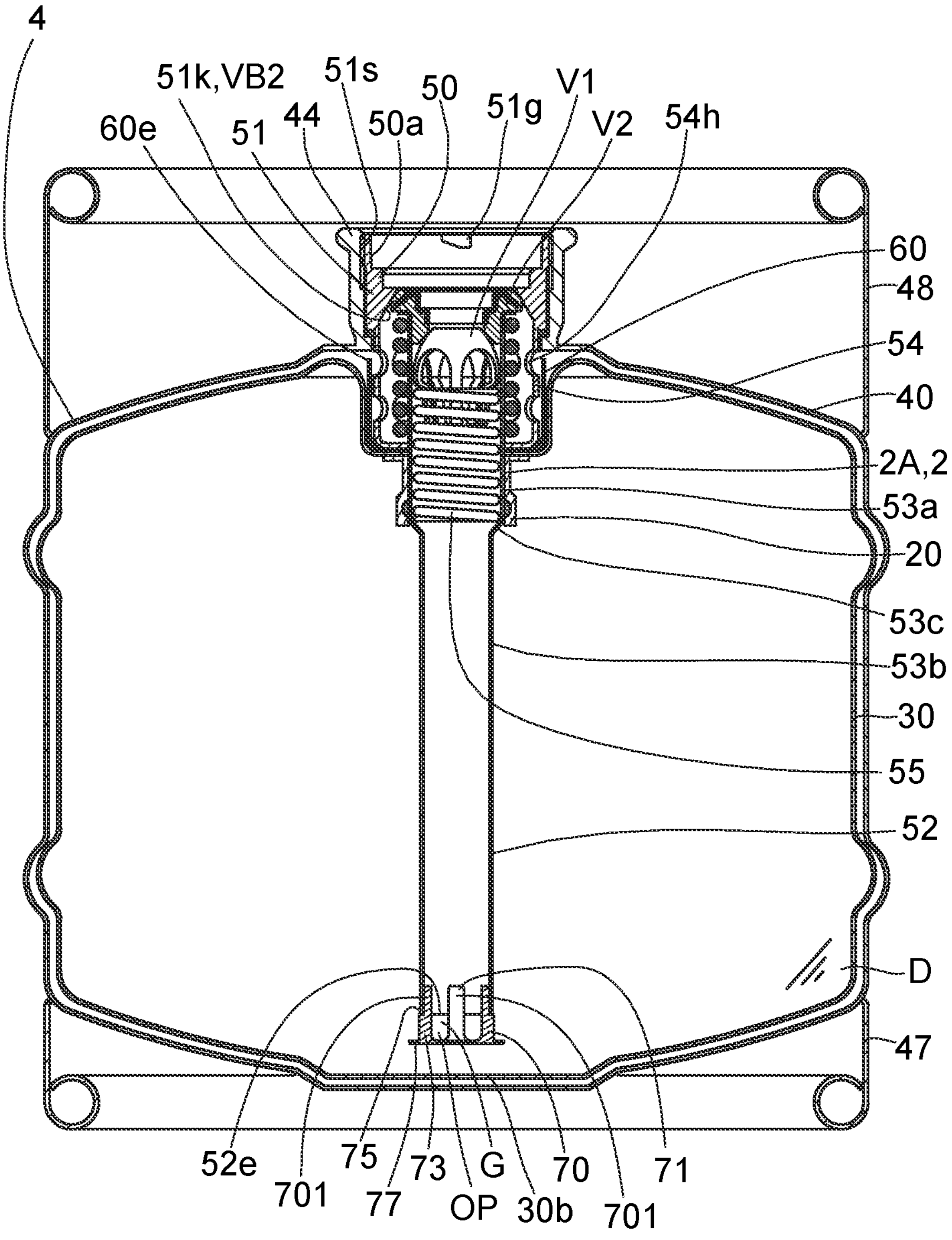
FIG. 20 is a schematic cross-sectional view schematically showing a state in which a beverage intake part is attached to a lower end portion of a beverage extraction pipe.
Figure 21:
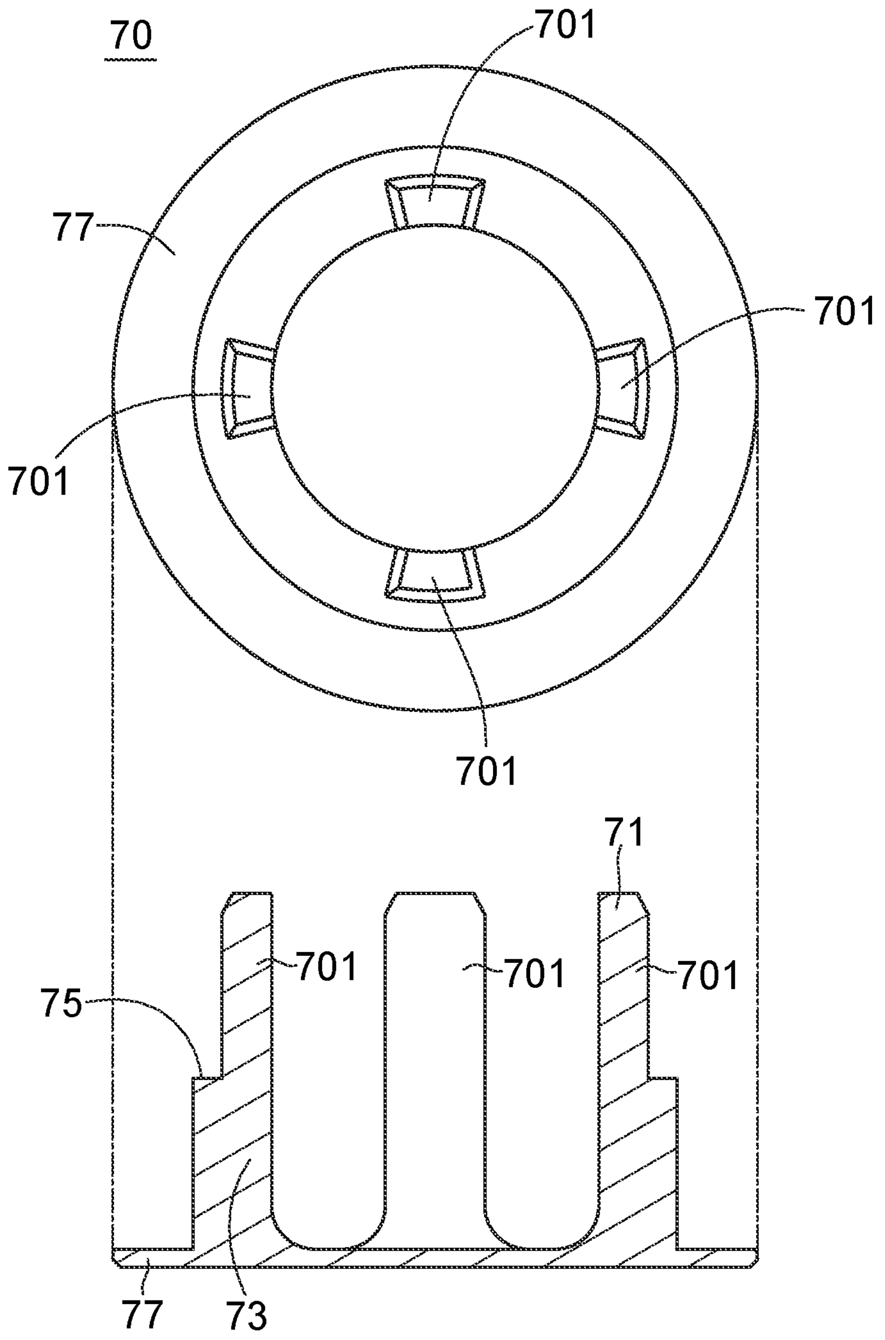
FIG. 21 is a schematic two-view schematically showing the beverage intake part.

Subsequently, with reference to FIGS. 20 and 21, a beverage intake part 70 attached to a lower end portion of the beverage extraction pipe 52 will be described. FIG. 20 is a schematic cross-sectional view schematically showing a state in which the beverage intake part 70 is attached to the lower end portion of the beverage extraction pipe 52. FIG. 21 is a schematic two-view schematically showing the beverage intake part 70. A plan view is shown on the upper side of FIG. 21, and a cross-sectional view is shown on the lower side of FIG. 21.

A replaceable component 2 for a beverage container according to some embodiments may include a beverage intake part 70 to be attached to the lower end portion of the beverage extraction pipe 52.

In the example shown in FIG. 2, a cutout portion 521 is formed at the lower end portion of the beverage extraction pipe 52. When the beverage is taken out from the bag 30 through the beverage extraction pipe 52, a lower end opening 52*h* (in other words, an opening facing a bottom portion 30*b* of the bag 30) of the beverage extraction pipe 52 may be blocked by the bag 30. Therefore, in the example shown in FIG. 2, the cutout portion 521 is formed at the lower end portion of the beverage extraction pipe 52 to allow the beverage to be taken into the beverage extraction pipe 52 even when the lower end opening 52*h* of the beverage extraction pipe 52 is blocked by the bag 30. The cutout portion 521 functions as a side opening formed in the beverage extraction pipe 52.

When the cutout portion 521 is formed at the lower end portion of the beverage extraction pipe 52, it is necessary to modify the conventional beverage extraction pipe. On the other hand, in an example shown in FIG. 20, a side opening OP can be provided without modifying the conventional beverage extraction pipe. More specifically, simply by attaching the beverage intake part 70 to the lower end portion of the beverage extraction pipe 52, the side opening OP for taking in the beverage is formed with the beverage extraction pipe 52. In the example shown in FIG. 20, a gap G formed between the lower end 52*e* of the beverage extraction pipe 52 and the beverage intake part 70 functions as the side opening OP.

In the example shown in FIG. 20, the beverage intake part 70 includes an inserting portion 71 inserted into the beverage extraction pipe 52 and a side opening forming portion 73 forming the side opening OP. The beverage intake part 70 may include a shoulder portion 75, which comes in contact with the lower end 52*e* of the beverage extraction pipe 52, and/or a bottom plate 77.

In the example shown in FIG. 20, the inserting portion 71 fits into the lower end portion of the beverage extraction pipe 52. From the viewpoint of fitting the inserting portion 71 to the lower end portion of the beverage extraction pipe 52, it is preferable that an outer diameter of the inserting portion 71 is the same as an inner diameter of the lower end portion of the beverage extraction pipe 52, or slightly larger than the inner diameter of the lower end portion. The outer diameter of the inserting portion 71 is, for example, about 17.5 mm (16 mm or more and 19 mm or less). In an example shown in FIG. 21, the beverage intake part 70 includes a plurality of leg portions 701, and the inserting portion 71 is constituted by tip portions of the plurality of leg portions 701. In the example shown in FIG. 21, the beverage intake part 70 includes four leg portions 701. Alternatively, the beverage intake part 70 may include two, three, or five or more leg portions 701.

In the example shown in FIG. 20, the plurality of leg portions 701 included in the beverage intake part 70 has a portion arranged outside the beverage extraction pipe 52, and said portion arranged outside the beverage extraction pipe 52 (in other words, a base end portion of the leg portion 701) constitutes the side opening forming portion 73. More specifically, in the example shown in FIG. 20, the side opening OP is formed by two leg portions 701 adjacent to each other, the lower end 52*e* of the beverage extraction pipe 52, and the bottom plate 77.

The shoulder portion 75 functions as a stopper for positioning the beverage intake part 70 with respect to the lower end 52*e* of the beverage extraction pipe 52. In the example shown in FIG. 20, the portion above the shoulder portion 75 is inserted into the beverage extraction pipe 52, and the portion below the shoulder portion 75 is exposed to the outside of the beverage extraction pipe 52.

The bottom plate 77 is a plate-shaped portion arranged to face the bottom portion 30*b* of the bag 30 (or a bottom portion of the beverage container 4). By arranging the bottom plate 77 to face the bottom portion of the bag 30 or to make contact with the bottom portion of the bag 30, the shape of a central portion of the bottom portion of the bag 30 is stabilized. In this way, it is possible to reduce an amount of beverage remaining without being taken out from the bag 30. In particular, when the bottom plate 77 is arranged in contact with the bottom portion 30*b* of the bag 30, the amount of beverage remaining without being taken out from the bag 30 can be made small. It is preferable that no through hole is formed in the bottom plate 77. However, in some embodiments, a through hole may be formed in the bottom plate 77.

An outer diameter of the bottom plate 77 is preferably smaller than the inner diameter of the tubular member 20. When the outer diameter of the bottom plate 77 is smaller than the inner diameter of the tubular member 20, the beverage extraction pipe 52 to which the beverage intake part 70 is attached can be easily inserted into the tubular member 20. The outer diameter of the bottom plate 77 is, for example, about 25 mm (24 mm or more and 26 mm or less).

The beverage intake part 70 is made of, for example, synthetic resin. Note that a timing of replacing the beverage intake part 70 that constitutes a part of the replaceable component 2 and a timing of replacing the tubular member 20 and the bag 30 that form another part of the replaceable component 2 may be the same timing or different timings. Further, the beverage intake part 70 may be a disposable component for one-time use or a component that can be used repeatedly a plurality of times.

Third Embodiment

In the first embodiment and the second embodiment, an example in which the fitting 50 is a well-type fitting in which a recess portion 50*a* (see, for example, FIG. 20) is formed at a top portion of the fitting has been described. Alternatively, the fitting 50 in some embodiments may be a flat-type fitting in which a top portion of the fitting is substantially flat.

Figure 22:
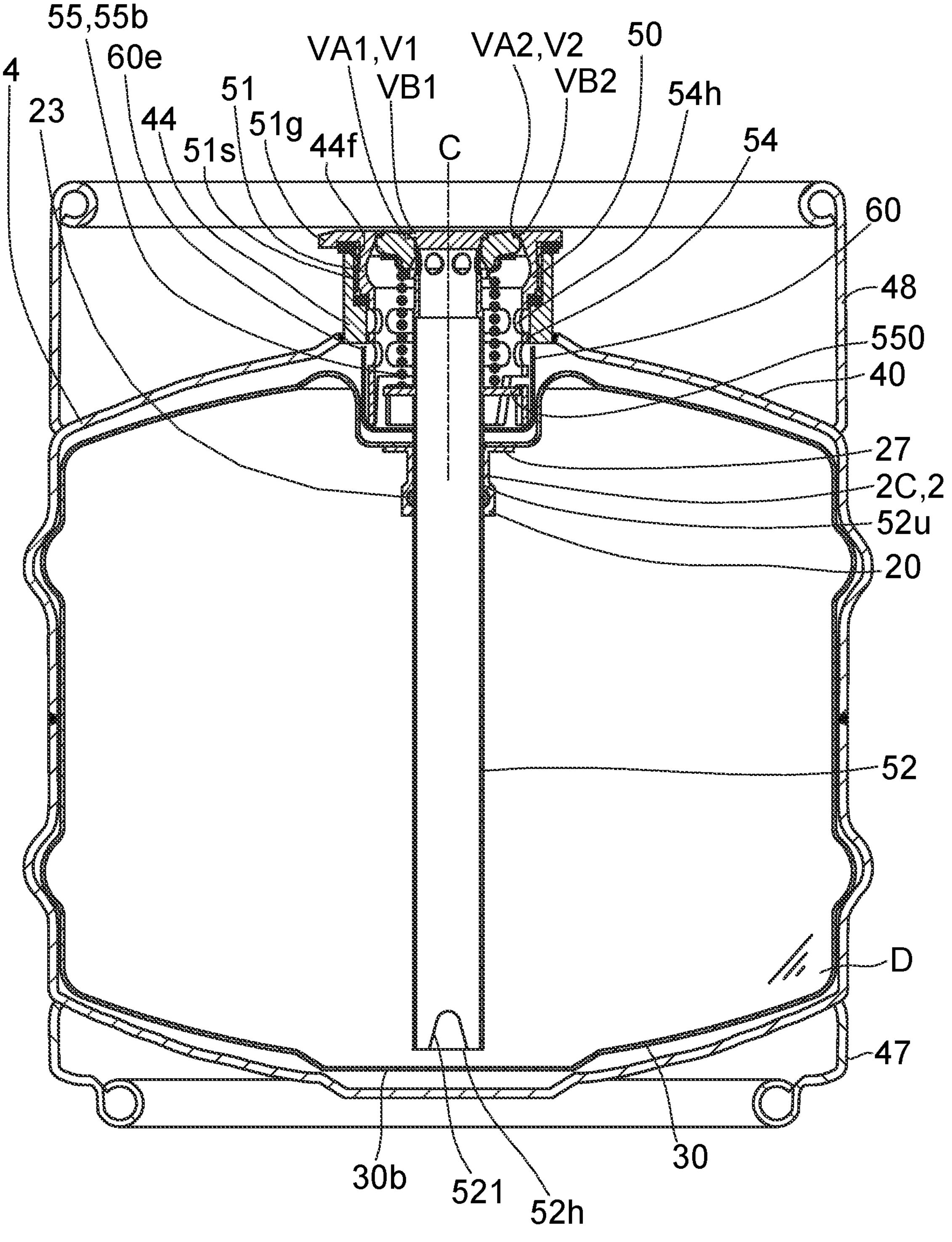
FIG. 22 is a schematic cross-sectional view schematically showing a combination of a replaceable component for a beverage container and a beverage container according to a third embodiment.
Figure 23:
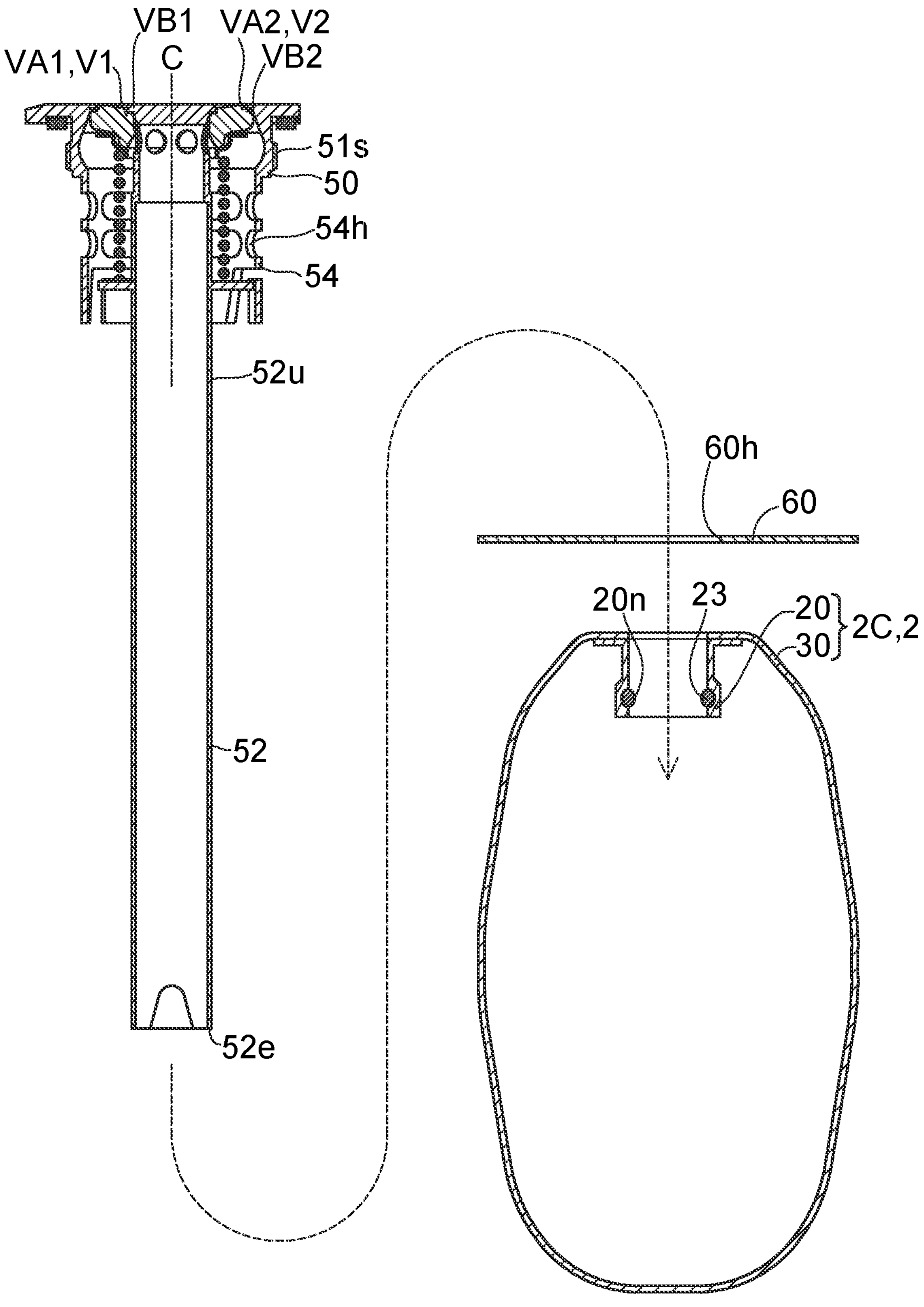
FIG. 23 is a schematic cross-sectional view schematically showing a state before the replaceable component for a beverage container according to the third embodiment is attached to a beverage extraction pipe.
Figure 24:
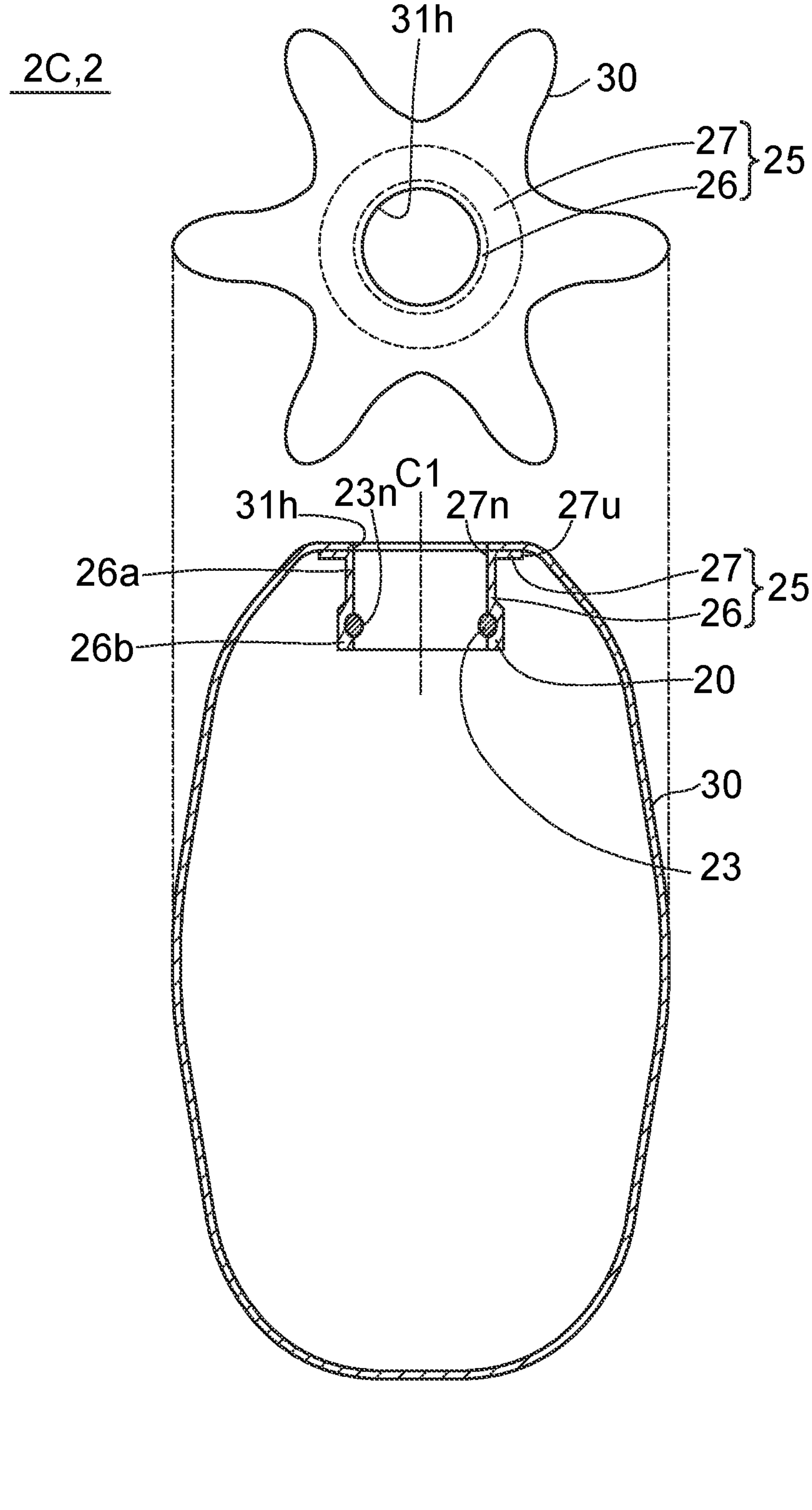
FIG. 24 is a schematic two-view schematically showing the replaceable component for a beverage container according to the third embodiment.

FIGS. 22 to 24 are drawings for explaining a replaceable component 2C for a beverage container adaptable to the flat type fitting 50, and the combination of the replaceable component 2C for a beverage container and a beverage container 4. FIG. 22 is a schematic cross-sectional view schematically showing the combination of the replaceable component 2C for a beverage container and the beverage container 4 according to the third embodiment. Note that FIG. 22 shows a state after the replaceable component 2C for a beverage container is attached to the beverage container 4 and a beverage D is filled in a bag 30. FIG. 23 is a schematic cross-sectional view schematically showing a state before the replaceable component 2C for a beverage container according to the third embodiment is attached to a beverage extraction pipe 52. FIG. 24 is a schematic two-view schematically showing the replaceable component 2C for a beverage container according to the third embodiment. A plan view is shown on the upper side of FIG. 24, and a cross-sectional view is shown on the lower side of FIG. 24.

The third embodiment is different from the first embodiment and the second embodiment in that the replaceable component 2C is a component attached to the beverage extraction pipe 52 that constitutes a part of the flat type fitting 50. In other respects, the third embodiment is the same as the first or second embodiment.

In the third embodiment, the differences from the first embodiment and the second embodiment will be mainly described. On the other hand, in the third embodiment, a repetitive description of the matters explained in the first embodiment or the second embodiment will be omitted. Therefore, it goes without saying that the matters explained in the first embodiment or the second embodiment can be applied to the third embodiment even if explanation is not explicitly given in the third embodiment.

In an example shown in FIG. 22, a replaceable component 2C is a component that can be attached to a beverage extraction pipe 52 of a beverage container 4. The replaceable component 2C has a tubular member 20 and a bag 30.

The tubular member 20 is slidable along a longitudinal direction of the beverage extraction pipe 52. Further, the tubular member 20 is in annular contact with an outer circumferential surface 52*u* of the beverage extraction pipe 52. In an example described in FIG. 23, the tubular member 20 has an annular seal portion 23 that contacts the outer circumferential surface 52*u* of the beverage extraction pipe 52.

The bag 30 is attached to the tubular member 20 and is used for containing a beverage.

The replaceable component 2C for a beverage container according to the third embodiment may include a protective sheet 60 to be arranged above the bag 30. As shown in FIG. 23, a through hole 60*h* into which the beverage extraction pipe 52 is inserted is formed in the protective sheet 60.

The replaceable component 2C for a beverage container according to the third embodiment may include a beverage intake part 70 (not shown in FIGS. 22 to 24) to be attached to a lower end portion of the beverage extraction pipe 52. Since the beverage intake part 70 has already been described with reference to FIGS. 20 and 21, a repetitive description of the beverage intake part 70 will be omitted.

As the tubular member 20, the bag 30 and the protective sheet 60 in the third embodiment, the tubular member 20, the bag 30 and the protective sheet 60 in the first embodiment or the second embodiment can be adopted. Since the tubular member 20, the bag 30, and the protective sheet 60 have already been described in detail in the first embodiment or the second embodiment, a repetitive description of these members will be omitted.

In a combination of the replaceable component 2C for a beverage container and a beverage container 4 according to the third embodiment, the beverage container 4 includes a beverage container main body 40, a mouth portion 44, and the beverage extraction pipe 52 arranged inside the beverage container main body 40. Since the beverage container main body 40, the mouth portion 44, and the beverage extraction pipe 52 have already been described in detail in the first embodiment or the second embodiment, a repetitive description of these members will be omitted. Note that among the members constituting the beverage container 4, members having the same functions as the members constituting the beverage container 4 in the first embodiment are designated by the same reference numerals as those assigned to the members constituting the beverage container 4 in the first embodiment, and for a description of the members with these reference numerals, the description in the first embodiment is incorporated.

For example, in the combination of the replaceable component 2C for a beverage container and the beverage container 4 according to the third embodiment, the beverage container 4 may include the fitting 50 attached to the mouth portion 44 of the beverage container 4. Further, the fitting 50 may include the beverage valve V1, the gas valve V2, the attachment portion 51 attached to the mouth portion 44, and the beverage extraction pipe 52 made of stainless steel. The fitting 50, which includes the beverage extraction pipe 52 made of stainless steel, may be reusable after being cleaned.

As for a method of using the replaceable component 2C for a beverage container according to the third embodiment, the method of using the replaceable component 2 for a beverage container described above can be adopted. Since each step (the first step ST1 to the ninth step ST9, the sub-step ST6-1 and the sub-step ST6-2, the sub-step ST7-1 to the sub-step ST7-4, the sub-step ST8-1 and the sub-step ST8-2) of the method of using the replaceable component for a beverage container has been described in detail with reference to FIGS. 10 to 19, a repetitive description of each step of the method of using the replaceable component 2C for a beverage container will be omitted.

The present invention is not limited to each of the above embodiments, and it is clear that each embodiment can be appropriately modified or can be changed within the scope of the technical idea of the present invention. In addition, the various techniques used in each embodiment can be applied to other embodiments as long as there is no technical contradiction. Further, any optional configuration in each embodiment can be omitted as appropriate.

Figure 25:
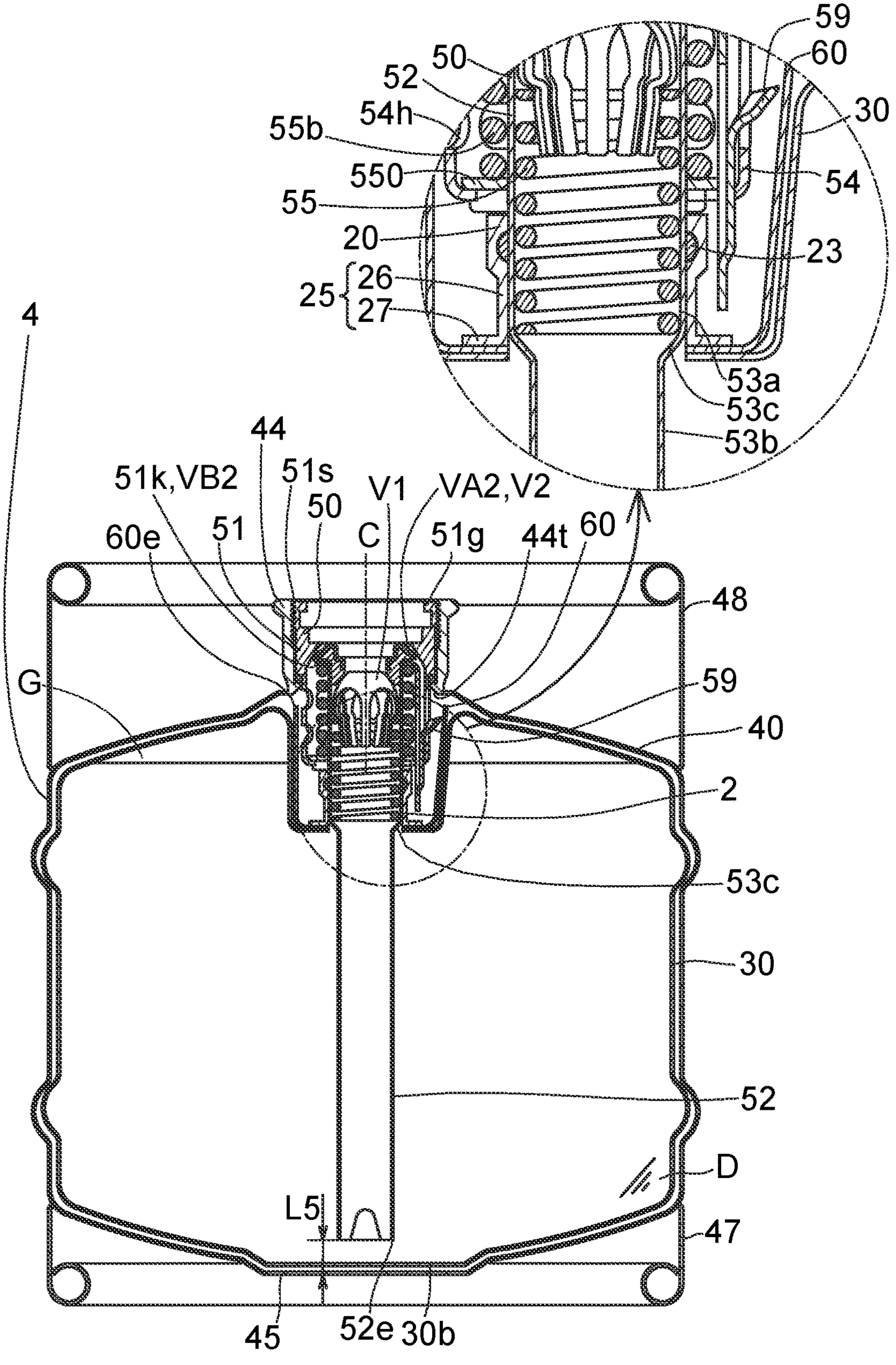
FIG. 25 is a schematic cross-sectional view schematically showing a combination of a replaceable component for a beverage container and a beverage container according to a modified embodiment.

For example, as shown in FIG. 25, which shows a modified example of the embodiment, the fitting 50 of the beverage container 4 may be provided with a removal-preventing member 59 that prevents the fitting 50 from being taken out from the beverage container 4. The removal-preventing member 59 prevents the fitting 50 from being taken out of the beverage container 4 without using a dedicated jig. On the other hand, after moving the removal-preventing member 59 in a direction toward the central axis of the mouth portion 44 using the dedicated jig, the fitting 50 including the beverage extraction pipe 52 can be removed from the beverage container 4.

In an example shown in FIG. 25, the removal-preventing member 59 projects outward as compared to the outer cylindrical portion 54. If the removal-preventing member 59 comes in contact with the bag 30, the bag 30 may be damaged. Therefore, in the example shown in FIG. 25, the protective sheet 60 prevents the bag 30 from coming in direct contact with the removal-preventing member 59. In this way, the damage to the bag 30 is prevented. Note that a configuration provided with the protective sheet 60 for preventing the bag 30 from coming in direct contact with the removal-preventing member 59 can also be adopted in the first to third embodiments.

Further, in the first to third embodiments described above, the examples in which the flange portion 27 is arranged at the upper end of the tubular portion 26 of the tubular member 20 has been described. The flange portion 27 may be arranged at a lower end of the tubular portion 26 as shown in FIG. 25. Alternatively, the flange portion 27 may be arranged in a middle portion of the tubular portion 26. In this case, the tubular portion 26 has an upper tubular portion arranged above the flange portion 27 and a lower tubular portion arranged below the flange portion 27.

In the example shown in FIG. 2, FIG. 22 or FIG. 25, etc., an upper end of the tubular member 20 is arranged below a spring member 55*b* (or a spring receiver 550 that supports the spring member 55*b*) that biases the valve body VA2 of the gas valve V2 upward. In this case, the tubular member 20 can be arranged by making good use of a space below the fitting 50. More specifically, the tubular member 20 can be arranged in a space inside a virtual cylinder formed by virtually extending the outer cylindrical portion 54 downward. For example, in the example shown in FIG. 2, FIG. 22 or FIG. 25, etc., the flange portion 27 of the tubular member 20 is arranged vertically below the spring member 55*b*.

As shown in FIG. 25, the lower end 52*e* of the beverage extraction pipe 52 is arranged adjacent to the bottom portion 45 of the beverage container 4. In a default state (for example, in a state in which the beverage valve V1 and the gas valve V2 are closed), the distance L5 between the lower end 52*e* of the beverage extraction pipe 52 and an inner surface of the bottom portion 45 of the beverage container 4 is, for example, 4 cm or less, 3 cm or less, 2 cm or less, or 1 cm or less. By arranging the lower end 52*e* of the beverage extraction pipe 52 near the bottom portion 45 of the beverage container 4, the amount of beverage remaining without being finally taken out from the bag 30 can be reduced.

As shown in FIG. 25, a lower end of the mouth portion 44 may have a tapered surface 44*t*. The tapered surface 44*t* is a surface whose inner diameter decreases in a direction upward. In a case in which the lower end of the mouth portion 44 has the tapered surface 44*t*, when the replaceable component 2 is taken out from the beverage container 4, the bag 30 (and the protective sheet 60) that comes in contact with the lower end of the mouth portion 44 is smoothly reduced in diameter by the tapered surface 44*t*. In this way, the voluminous bag 30 can be smoothly taken out from the beverage container 4 via the mouth portion 44. Note that a configuration in which the lower end of the mouth portion 44 has the tapered surface 44*t* can also be adopted in the first to third embodiments.

The replaceable component 2 for a beverage container according to the embodiments is applicable to any beverage container in which a beverage extraction pipe is arranged. For example, the replaceable component 2 for a beverage container may be applied to a steel drum in which a beverage extraction pipe is arranged.

DESCRIPTION OF THE REFERENCE NUMERALS

1 beer storage container, 2, 2A, 2B, 2C replaceable component for beverage container, 2*n* new replaceable component, 4 beverage container, 8 dispense head, 10 fitting, 10*s* male threaded portion, 15 mouth portion, 15*s* female threaded portion, 20 tubular member, 20*n* inner circumferential surface, 23 seal portion, 23*n* inner circumferential surface, 25 tubular member main body, 26 tubular portion, 26*a* upper end portion, 26*b* lower end portion, 27 flange portion, 27*n* inner edge, 27*u* outer edge, 30 bag, 30*b* bottom portion, 31 first sheet, 31*e* outer peripheral portion, 31*h* through hole, 32 second sheet, 32*e* outer peripheral portion, 40 beverage container main body, 44 mouth portion, 44*f* female threaded portion, 44*m* minimum inner diameter portion, 44*t* tapered surface 45 bottom portion, 47 bottom protector, 48 top protector, 50 fitting, 50*a* recess portion, 51 attachment portion, 51*g* engaging portion, 51*k* inclined surface, 51*s* male threaded portion, 52 beverage extraction pipe, 52*e* lower end, 52*h* lower end opening, 52*u* outer circumferential surface, 53*a* large-diameter pipe portion, 53*b* small-diameter pipe portion, 53*c* shoulder portion, 54 outer cylindrical portion, 54*h* through hole portion, 55 spring member, 55*b* spring member, 56 first valve member, 57 second valve member, 59 removal-preventing member, 60 protective sheet, 60*h* through hole, 70 beverage intake part, 71 inserting portion, 73 side opening forming portion, 75 shoulder portion, 77 bottom plate, 80 main body, 80*h* gas inlet hole, 81*g* second engaging portion, 85 plunger member, 521 cutout portion, 550 spring receiver, 701 leg portion, 851 pressing portion, D beverage, OP side opening, P1 beverage flow channel, P2 gas flow channel, S1 first sealing member, S2 second sealing member, SP1 first space, V1 beverage valve, V2 gas valve, V3 check valve, VA1 valve body of beverage valve, VA2 valve body of gas valve, VB1 valve seat portion of beverage valve, VB2 valve seat portion of gas valve

The invention claimed is:

1. A replaceable component for a beverage container to be attached to a beverage extraction pipe of a fitting, the fitting having the beverage extraction pipe, an attachment portion attached to a mouth portion of the beverage container, and an outer cylindrical portion arranged radially outside the beverage extraction pipe, the replaceable component comprising:

a tubular member that is slidable along a longitudinal direction of the beverage extraction pipe and capable of coming in annular contact with an outer circumferential surface of the beverage extraction pipe;

a bag for containing a beverage, the bag being attached to the tubular member; and a non-bag-shaped protective sheet arranged above the bag, wherein the tubular member includes:

a tubular portion that functions as a guided portion guided by the beverage extraction pipe when the tubular member moves along the longitudinal direction of the beverage extraction pipe; and a flange portion to which the bag is welded, wherein the non-bag-shaped protective sheet has a through hole into which the beverage extraction pipe is to be inserted, and wherein the non-bag-shaped protective sheet is deformable upwardly such that, in a state in which the replaceable component is attached to the beverage extraction pipe of the fitting, the non-bag-shaped protective sheet is deformed so as to face an outer circumferential surface of the outer cylindrical portion.

2. The replaceable component for a beverage container according to claim 1, wherein the tubular member includes an annular seal portion configured to come in contact with the outer circumferential surface of the beverage extraction pipe.

3. A combination comprising:

a replaceable component for a beverage container; and a beverage container, wherein the beverage container comprises:

a beverage container main body; and a fitting attached to a mouth portion of the beverage container, wherein the fitting includes:

a beverage extraction pipe inserted into the beverage container main body;

an attachment portion attached to the mouth portion; and an outer cylindrical portion arranged radially outside the beverage extraction pipe, wherein the replaceable component comprises:

a tubular member that is slidable along a longitudinal direction of the beverage extraction pipe and configured to come in annular contact with an outer circumferential surface of the beverage extraction pipe;

a bag for containing a beverage attached to the tubular member; and a non-bag-shaped protective sheet arranged above the bag, wherein the tubular member includes:

a tubular portion that functions as a guided portion guided by the beverage extraction pipe when the tubular member moves along the longitudinal direction of the beverage extraction pipe; and a flange portion to which the bag is welded, wherein the non-bag-shaped protective sheet has a through hole into which the beverage extraction pipe is to be inserted, wherein a plurality of through hole portions are formed in the outer cylindrical portion, and wherein the non-bag-shaped protective sheet is deformable upwardly such that, in a state in which the replaceable component is attached to the beverage extraction pipe of the fitting, the non-bag-shaped protective sheet is deformed so as to face an outer circumferential surface of the outer cylindrical portion.

4. The combination according to claim 3, wherein the fitting includes:

a beverage valve; and a gas valve;

wherein the beverage extraction pipe is made of stainless steel, and wherein the fitting including the beverage extraction pipe made of the stainless steel is reusable after being cleaned.

5. The combination according to claim 4, wherein the fitting includes a removal-preventing member that prevents the fitting from being removed from the beverage container, and wherein the non-bag-shaped protective sheet prevents the bag from coming in direct contact with the removal-preventing member.

6. The combination according to claim 3, wherein the replaceable component includes a beverage intake part attached to a lower end portion of the beverage extraction pipe.

7. The combination according to claim 3, wherein the beverage extraction pipe constitutes a part of a well-type fitting or a part of a flat-type fitting.

8. The combination according to claim 3, wherein the beverage extraction pipe includes:

a shoulder portion;

a small-diameter pipe portion arranged below the shoulder portion; and a large-diameter pipe portion arranged above the shoulder portion, and wherein the tubular member is attached to the large-diameter pipe portion so as to come in annular contact with the large-diameter pipe portion.

9. The combination according to claim 3, wherein the beverage extraction pipe includes:

a shoulder portion;

a small-diameter pipe portion arranged below the shoulder portion; and a large-diameter pipe portion arranged above the shoulder portion, and wherein the tubular member is attached to the small-diameter pipe portion so as to come in annular contact with the small-diameter pipe portion.

10. A method of using a replaceable component for a beverage container, the replaceable component comprising:

a tubular member having a flange portion;

a bag welded to the flange portion of the tubular member; and a non-bag-shaped protective sheet arranged above the bag, wherein the non-bag-shaped protective sheet has a through hole into which a beverage extraction pipe is to be inserted, wherein the beverage container includes a fitting attached to a mouth portion of the beverage container, wherein the fitting includes:

the beverage extraction pipe;

an attachment portion attached to the mouth portion; and an outer cylindrical portion arranged radially outside the beverage extraction pipe, wherein a plurality of through hole portions are formed in the outer cylindrical portion, and wherein the non-bag-shaped protective sheet is deformable upwardly, the method comprising:

inserting the beverage extraction pipe into the through hole of the non-bag-shaped protective sheet;

inserting a lower end of the beverage extraction pipe into the tubular member;

sliding the tubular member along a longitudinal direction of the beverage extraction pipe such that a part of the beverage extraction pipe protrudes from a lower end of the tubular member;

attaching the replaceable component to the beverage extraction pipe such that the non-bag-shaped protective sheet is deformed upwardly so as to face an outer circumferential surface of the outer cylindrical portion, and such that a state in which the tubular member is in annular contact with an outer circumferential surface of the beverage extraction pipe is maintained; and inserting the beverage extraction pipe to which the replaceable component has been attached into the beverage container.

11. The method according to claim 10, wherein the attaching of the replaceable component includes attaching the replaceable component to the beverage extraction pipe by utilizing a frictional force acting between an inner circumferential surface of the tubular member and the outer circumferential surface of the beverage extraction pipe.

12. The method according to claim 10, further comprising:

detaching the replaceable component from the beverage extraction pipe; and reattaching a new replaceable component to the beverage extraction pipe, wherein the beverage extraction pipe to which the new replaceable component is attached in the reattaching is a component that has been cleaned and reused.

13. The replaceable component for a beverage container according to claim 1, wherein the tubular member includes:

an annular seal portion made of elastic material and configured to come in contact with the outer circumferential surface of the beverage extraction pipe;

the tubular portion holding the seal portion; and the flange portion having an inner edge connected to the tubular portion, an outer edge, and an upper surface to which the bag is welded.

14. The combination according to claim 3, wherein the tubular member includes:

an annular seal portion made of elastic material and configured to come in contact with the outer circumferential surface of the beverage extraction pipe;

the tubular portion holding the seal portion; and the flange portion having an inner edge connected to the tubular portion, an outer edge, and an upper surface to which the bag is welded.

15. The combination according to claim 14, wherein the fitting includes:

a beverage valve; and a gas valve;

wherein the flange portion of the tubular member is arranged vertically below a spring member that biases a valve body of the gas valve upward.

16. The combination according to claim 3, wherein the fitting includes:

a beverage valve; and a gas valve;

wherein an upper end of the tubular member is arranged below a spring receiver that supports a spring member biasing a valve body of the gas valve upward.

17. The combination according to claim 3, wherein the fitting includes:

a beverage valve; and a gas valve;

wherein the tubular member is arranged in a space inside a virtual cylinder formed by virtually extending the outer cylindrical portion downward.

18. The combination according to claim 3, wherein the fitting includes:

a beverage valve; and a gas valve;

wherein the beverage extraction pipe includes:

a shoulder portion;

a small-diameter pipe portion arranged below the shoulder portion; and a large-diameter pipe portion arranged above the shoulder portion, wherein the tubular member is attached to the large-diameter pipe portion so as to come in annular contact with the large-diameter pipe portion, and wherein the shoulder portion directly supports a spring member that biases a valve body of the beverage valve upward.

19. The method according to claim 10, wherein the fitting includes:

a beverage valve; and a gas valve;

wherein the beverage extraction pipe includes:

a shoulder portion;

a small-diameter pipe portion arranged below the shoulder portion; and a large-diameter pipe portion arranged above the shoulder portion, wherein a minimum inner diameter of the tubular member before being attached to the beverage extraction pipe of the fitting is smaller than an outer diameter of the large-diameter pipe portion of the beverage extraction pipe, and wherein the tubular member is held only by the large-diameter pipe portion by an elastic force that causes the tubular member to return to its original shape, after the tubular member is attached to an outer circumferential surface of the large-diameter pipe portion.

20. The combination according to claim 3, wherein the non-bag-shaped protective sheet prevents or suppresses the bag from coming in contact with the through hole portions of the fitting.

* * * * *